United States Patent [19]

Fencil et al.

[11] Patent Number: 4,875,165
[45] Date of Patent: Oct. 17, 1989

[54] METHOD FOR DETERMINATION OF 3-D STRUCTURE IN BIPLANE ANGIOGRAPHY

[75] Inventors: Laura E. Fencil, Chicago; Charles E. Metz; Kunio Doi, both of Willowbrook, all of Ill.

[73] Assignee: University of Chicago, Chicago, Ill.

[21] Appl. No.: 126,266

[22] Filed: Nov. 27, 1987

[51] Int. Cl.⁴ .................. G01B 11/24; G06F 15/42
[52] U.S. Cl. .................... 364/413.22; 364/413.13; 356/2
[58] Field of Search ............... 364/413.22, 413.13, 364/413.23; 378/901; 358/111; 356/2

[56] References Cited

U.S. PATENT DOCUMENTS 4,099,880  7/1978  Kano .................... 356/164
4,630,203  12/1986  Szirtes .................. 364/413.13

OTHER PUBLICATIONS

Laura E. Fencil et al., "Accurate Analysis of Blood Vessel Sizes and Stenotic Lesions etc" to be published in Dec. 1987 in Investigative Radiology (See p. 3, lines 7-8 of Application).
Laura E. Fencil et al., "Accurate Analysis of Blood Flow and Stenotic Lesions by Using Stereoscoptic DSA System", Medical Physics, 1987, 14, p. 460, Presented at AAPM, 1987.
Tsai et al., "Estimating Three-Dimensional Motion Parameters of a Planar Patch", Technical Report, Co-ordinated Science Laboratory, University of Illinois, (1981).
Heintzen et al., "Digital Imaging in Cardiovascular Radiology", International Symposium Kiel, Apr. 1982, pp. 151-163.
MacKay et al., "Graphics Methods for Tracking Three-Dimensional Heart Wall Motion", Computers and Biomedical Research, 15, 445-473, (1982).
Hoffman et al., "Automated Tracking of the Vascular Tree in DSA Images etc", SPIE vol. 626, Medicine XIV/PACSIV, pp. 326-333, (1986).
H. C. Longuet-Higgens, "A Computer Algorithm for Reconstructing a Scene from Two Projections", Nature, vol. 293, Sep. 10, 1981, pp. 133-135.
H. C. Longuet-Higgens, "Configurations that Defeat the 8-Point Algorithm", Image Understanding, Chapter 7, pp. 173-177, (1984).
Rubin et al., "A Computer-Aided Technique for Overlaying Cerebral Angiograms Onto Computed Tomograms", Investigative Radiology, vol. 13, No. 5, pp. 362-367, Sep.-Oct. 1978.

Primary Examiner—Jerry Smith
Assistant Examiner—Kim Thanh Tbui
Attorney, Agent, or Firm—Oblon, Spivak, McClelland, Maier & Neustadt

[57] ABSTRACT

A novel method for determination of 3-D structure in biplane angiography, including determining the distance of a perpendicular line from the focal spots of respective x-ray sources to respective image planes and defining the origin of each biplane image as the point of intersection with the perpendicular line thereto, obtaining two biplane digital images at arbitrary orientations with respect to an object, identifying at least 8 points in both images which correspond to respective points in the object, determining the image coordinates of the 8 or more identified object points in the respective biplane images, constructing a set of linear equations in 8 unknowns based on the image coordinates of the object points and based on the known focal spot to image plane distances for the two biplane images; solving the linear equations to yield the 8 unknowns, which represent the fundamental geometric parameters of the biplane imaging system; using the fundamental parameters to calculate the 3-dimensional positions of the object points identified in the biplane images; and determination of the 3-D positions of the vessel segments between the object points.

13 Claims, 20 Drawing Sheets

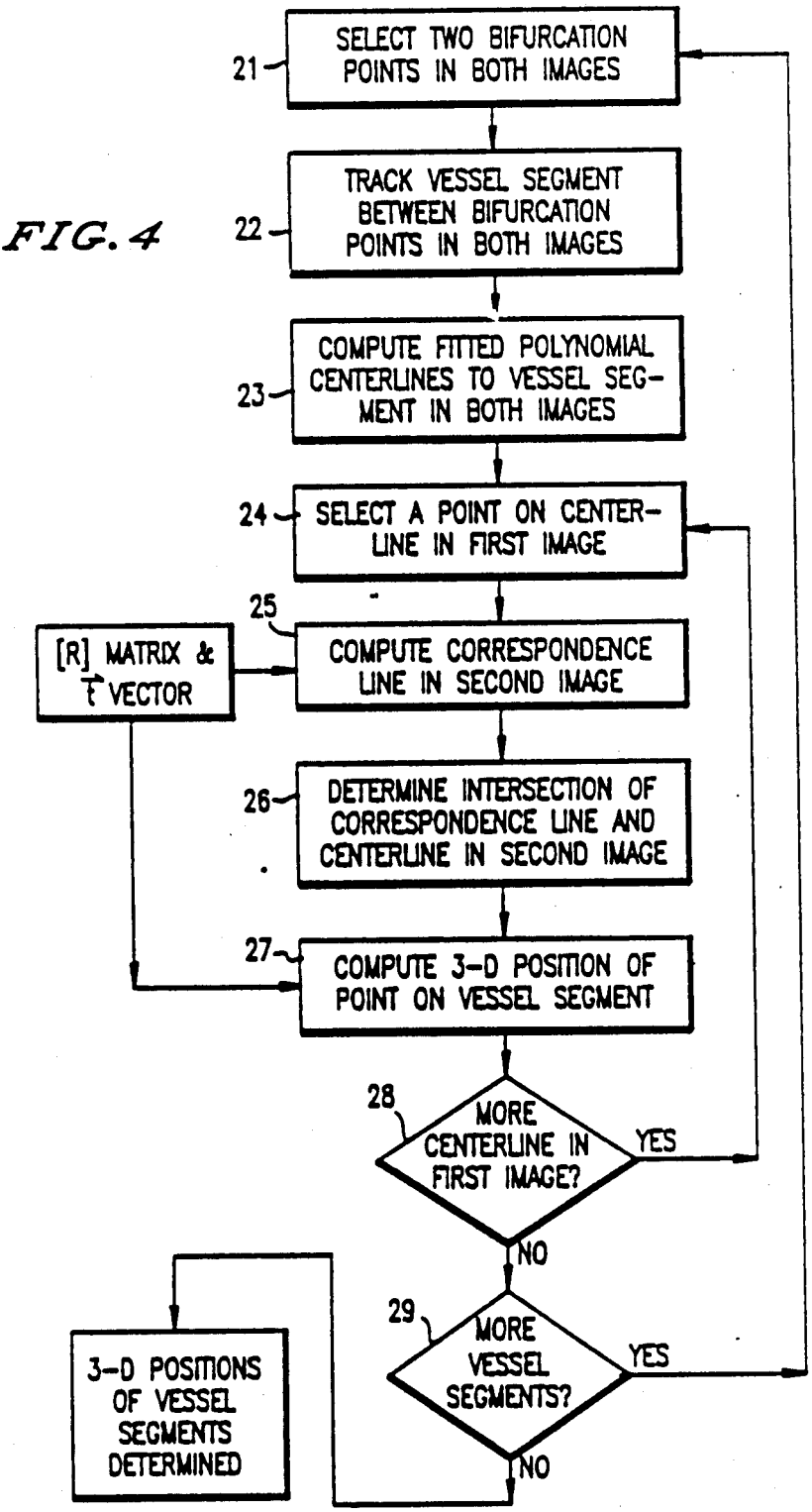

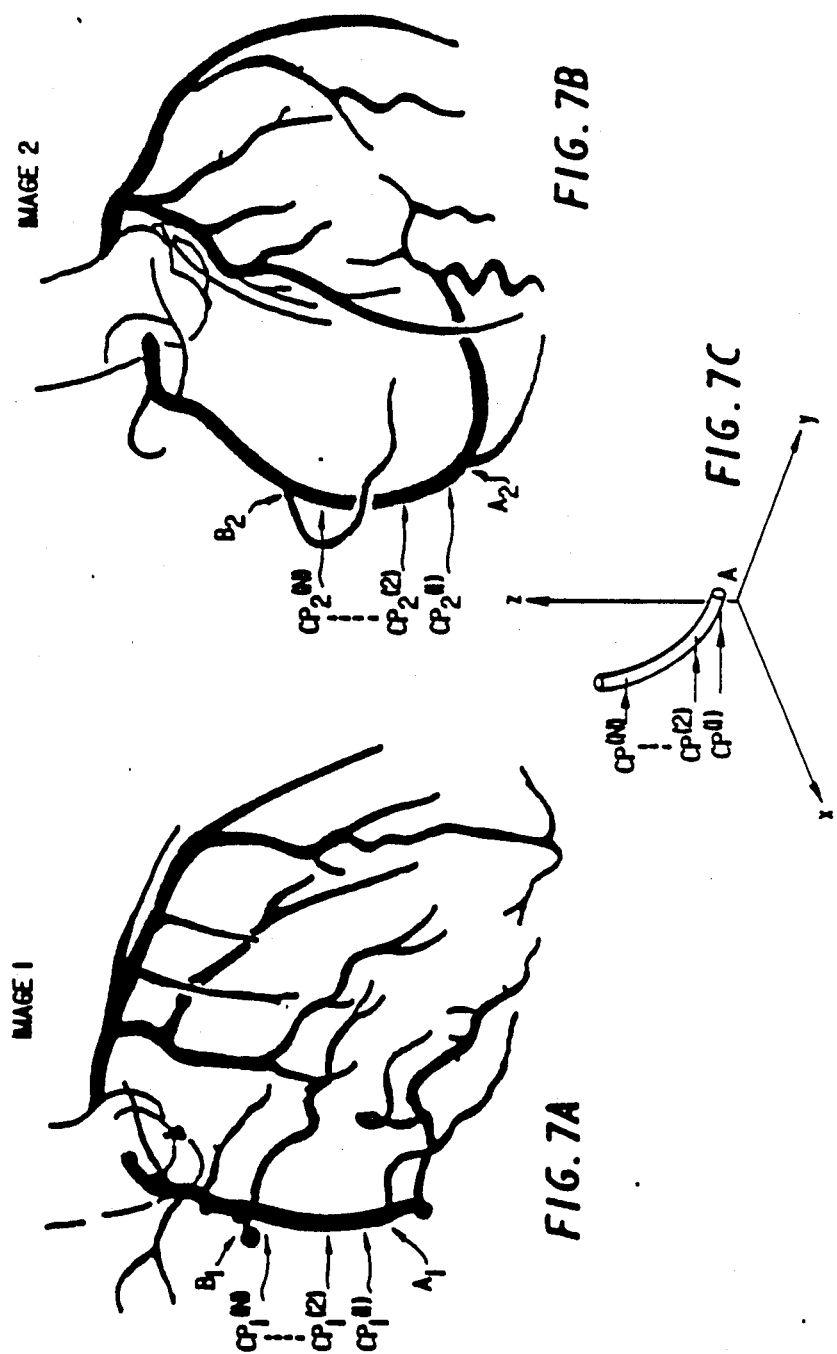

$$l_2 = \left(\frac{H_2}{H_1}\right) l_1$$

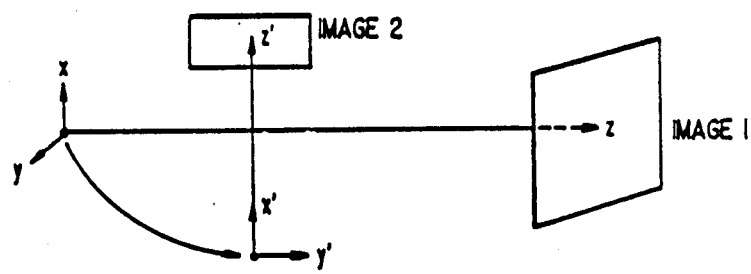
FIG. 16A ROTATION ABOUT x'
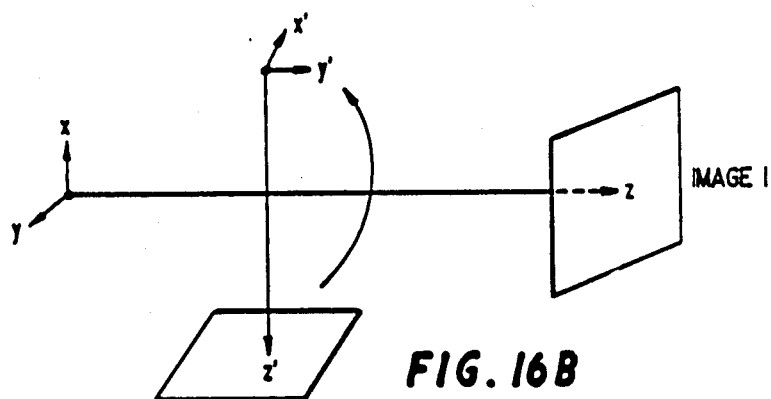
FIG. 16B
ROTATION ABOUT y'
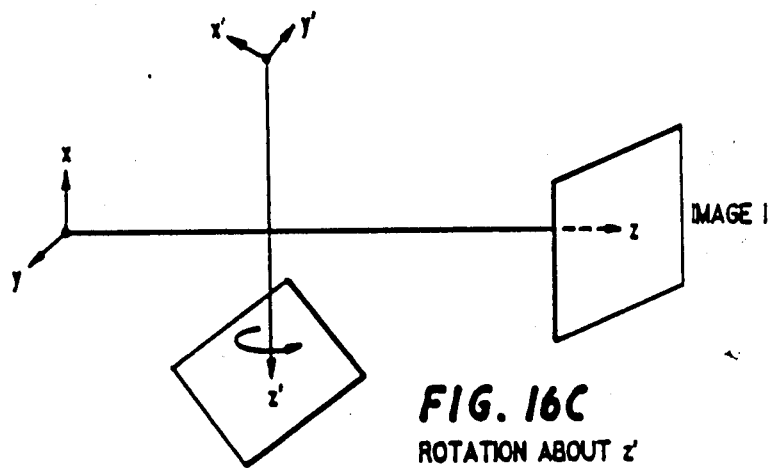
FIG. 16C
ROTATION ABOUT z'

FIG. 17

| TRIAL | D (cm) | D' (cm) | S1 | S2 | SKEW (mm) | ROTATION ABOUT x' (DEGREES) | ROTATION ABOUT y' (DEGREES) | ROTATION ABOUT z' (DEGREES) | N | AVERAGE DISTANCE (mm) |
|---|---|---|---|---|---|---|---|---|---|---|
| 1 | 90 | 90 | 0.5 | 0.5 | 0 | 90 | 10 | 10 | 8 | 0.029 |
| 2 | 90 | 90 | 0.5 | 0.5 | 0 | 10 | 10 | 10 | 8 | 0.160 |
| 3 | 90 | 90 | 0.5 | 0.5 | 0 | 45 | 10 | 10 | 8 | 0.093 |
| 4 | 90 | 90 | 0.5 | 0.5 | 0 | 135 | 10 | 10 | 8 | 0.210 |
| 5 | 90 | 100 | 0.5 | 0.5 | 0 | 90 | 10 | 10 | 8 | 0.120 |
| 6 | 80 | 100 | 0.5 | 0.5 | 0 | 90 | 10 | 10 | 8 | 0.028 |
| 7 | 90 | 90 | 0.3 | 0.7 | 0 | 90 | 10 | 10 | 8 | 0.019 |
| 8 | 90 | 90 | 0.3 | 0.8 | 0 | 90 | 10 | 10 | 8 | 0.011 |
| 9 | 90 | 90 | 0.9 | 0.5 | 0 | 90 | 10 | 10 | 8 | 0.150 |
| 10 | 90 | 90 | 0.5 | 0.5 | 10 | 90 | 10 | 10 | 9 | 0.011 |
| 11 | 90 | 90 | 0.5 | 0.5 | 20 | 90 | 10 | 10 | 9 | 0.013 |
| 12 | 90 | 90 | 0.5 | 0.5 | 30 | 90 | 10 | 10 | 9 | 0.021 |
| 13 | 90 | 90 | 0.5 | 0.5 | 40 | 90 | 10 | 10 | 9 | 0.029 |
| 14 | 90 | 90 | 0.5 | 0.5 | 0 | 90 | 10 | 10 | 15 | 0.0035 |
| 15 | 90 | 90 | 0.5 | 0.5 | 0 | 10 | 10 | 10 | 15 | 0.0054 |
| 16 | 90 | 90 | 0.5 | 0.5 | 0 | 45 | 10 | 10 | 15 | 0.0130 |
| 17 | 90 | 90 | 0.5 | 0.5 | 0 | 135 | 10 | 10 | 15 | 0.0088 |
| 18 | 90 | 90 | 0.5 | 0.5 | 0 | 90 | 0 | 0 | 15 | 0.18 |
| 19 | 90 | 90 | 0.5 | 0.5 | 0 | 10 | 0 | 0 | 15 | 5.23 |
| 20 | 90 | 90 | 0.5 | 0.5 | 0 | 45 | 0 | 0 | 15 | 0.16 |
| 21 | 90 | 90 | 0.5 | 0.5 | 0 | 135 | 0 | 0 | 15 | 0.30 |

METHOD FOR DETERMINATION OF 3-D STRUCTURE IN BIPLANE ANGIOGRAPHY

BACKGROUND OF THE INVENTION

1. Field of the Invention

This invention relates to a method for determining 3-dimensional structure in biplane angiography from two biplane images obtained at arbitrary orientations with respect to an object.

2. Discussion of Background

The development of digital imaging techniques in the last twenty years has greatly expanded the field of radiology. Digital subtraction angiography (DSA) makes use of the digital format of the vascular images by the subtraction of a mask frame from an image containing contrast-filled vessels. The result is an image in which intervening structures and background have been removed. At present, DSA images are widely used in the diagnosis and treatment planning of most diseases of vessels, including atherosclerosis, aneurysms, arteriovenous malformations, etc.

The digital format of DSA also lends itself well to quantitative measurements of the vascular system. Many researchers have developed methods using single DSA images to quantify physical parameters such as vessel size, the amount of narrowing (or stenosis) of a vessel, or the rate of blood flow in a given vessel or supplying a given tissue. The application of all such quantitative methods is complicated by the fact that a single projection image of the vasculature provides little information concerning the true 3-dimensional vascular structure. Thus, the magnification of a vessel, which is a function of its relative 3-dimensional position between the x-ray source and the imaging plane, is difficult to derive from a single image. In calculations of vessel size and blood flow rate, the magnification of the vessel enters as the first and third power, respectively. (LE Fencil, et al, Accurate Analysis of Blood Flow and Stenotic Lesions by Using Stereoscopic DSA System, Medical Physics, 1987, 14, p. 460, presented at AAPM, 1987). In addition, the 3-dimensional orientation of the vessel with respect to the imaging plane is difficult or impossible to infer from a single image. Knowledge of the orientation of vessels is important for quantitative blood flow measurement, and is also important for the diagnosis of vessel malformations and for surgical planning.

In short, an accurate 3-dimensional (3-D) representation of the vascular structure would be very useful in many areas of medicine.

Several methods have been developed which derive 3-D information from two digital images. Stereoscopic digital angiography has been used in the calculation of 3-D position and orientation information of vessels (LE Fencil et al., Investigative Radiology, December 1987; and KR Hoffman et al., SPIE Medical Imaging, Vol. 767, p. 449, 1987). However, stereoscopic determination of 3-D vessel position becomes less accurate if the orientation of the vessel is close to the direction of the stereoscopic shift. Thus, the reliability of this method in determining 3-D vascular structure depends on the orientations of the vessels themselves.

Szirtes in U.S. Pat. No. 4,630,203 describes a technique for the 3-D localization of linear contours appearing in two stereoscopic images. However, this method also suffers from the limitation that the contour must not lie in the direction of the stereoscopic shift. In addition, a separate calibration step is required in this method to determine the 3-D locations of the x-ray sources relative to the imaging plane.

Several workers have developed methods to derive 3-D structure from two radiographic images that are obtained in exactly orthogonal directions (A. Dwata et al., World Congress in Medical Physics and Biomedical Engineering, 1985; and JHC Reiber et al., Digital Imaging in Cardiovascular Radiology, Georg Thiem Verlag, 1983). The 3-D information obtained with these techniques in binary: i.e., no gray levels remain in the reconstructed image of the 3-D object. Secondly, the images must be obtained in exactly orthogonal directions, which may be difficult to achieve in conventional biplane radiography systems. Also, determination of the positions of vessel segments which run in a direction perpendicular to one of the imaging planes is difficult or impossible with these methods.

To eliminate these problems, a method has been developed that allows calculation of 3-D vascular structure from two images obtained at arbitrary orientations (see JM Rubin et al., Investigative Radiology, Vol. 13, p. 362, 1978; and SA MacKay et al., Computers and Biomedical Research, Vol. 15, p. 455, (1982)). This method is important, but requires a separate, somewhat cumbersome calibration step which is executed either before or after imaging the patient. Specifically, a calibration object of known dimensions is imaged in the same biplane configuration as is used to image the patient. Data are then collected from the images of the calibration object, and parameters are calculated to provide the 3-D positions of selected points in the vascular images.

A different technique has been described in the field of computer vision to determine 3-D positions of object points from two arbitrary views without a calibration step. This method was described in two independent theoretical papers. (HC Longuet-Higgins, Nature, Vol. 293, p. 133, 1981; and RY Tsai, TS Huang, Technical Report, Coordinated Science Laboratory, University of Illinois, Nov. 12, 1981). It does not appear, however, that this approach has ever been successfully applied in the field of radiology.

SUMMARY OF THE INVENTION

Accordingly, one object of this invention is to provide a novel method for determination of 3-D vascular structure from two biplane images, wherein the biplane images can be obtained at arbitrary orientations with respect to an object.

Another object is to provide such a method which is rapid, requires minimal additional equipment, and is inexpensive and easy to implement in existing digital angiographic systems.

Yet another object of this invention is to provide a new and improved method for determination of 3-D structure in biplane angiography with minimal prior knowledge concerning the biplane imaging geometry and using biplane images of arbitrary relative orientation.

These and other objects are achieved according to the present invention by providing a novel method for determination of 3-D structure in biplane angiography, including determining the distances of perpendicular lines from the focal spots of respective x-ray sources to respective image planes and defining the origin of each biplane image as the point of intersection with the perpendicular line thereto, obtaining two biplane digital images at arbitrary orientations with respect to an object, identifying at least 8 points in both images which correspond to respective points in the object, determining the image coordinates of the 8 identified object points in the respective biplane unknowns based on the image coordinates of the object points and based on the known focal spot to image plane distances for the two biplane images; solving the linear equations to yield the 8 unknowns, which represent the fundamental geometric parameters of the biplane imaging system; using the fundamental parameters to calculate the 3-dimensional positions of the object points identified in the biplane images; and determination of the 3-D positions of the vessel segments between the object points. Thus, the entire 3-D structure of the vasculature is determined.

The present invention allows the determination of complete 3-D vascular structure from two biplane images obtained by arbitrary orientations. This method does not require a separate calibration step for each imaging geometry, and requires only minimal prior knowledge concerning the imaging system. Some of the mathematics utilized in this technique, although independently derived, bear strong similarity to the mathematics in the Longuet-Higgins paper above-noted and described hereinafter. However, the present method represents the first successful application of this theoretical method to the radiological field. Also described hereinafter is the solution of several problems which arise in the application of this technique to angiographic images. In addition, this technique is extended to one which will reconstruct the entire vasculature appearing in the two images. Previous theoretical reports describe a method for localizing points in 3 dimensions, but not for determining entire connected vascular structures.

The technique for the complete reconstruction of vascular structure from two biplane images according to the invention has many advantages. First, the use of biplane images (instead of stereo images, for example) is helpful because there are many more biplane digital systems presently installed than there are stereoscopic digital systems. Secondly, because the present technique utilizes images from biplane systems that allow almost arbitrary positioning of the imaging projections, imaging geometries may be chosen for optimal visualization and reconstruction of the vessels of interest. This is a distinct advantage over methods employing stereoscopic or orthogonal projections. Varying the imaging geometry can ensure that vessel segments of interest will not run in a direction exactly perpendicular to one of the imaging planes, which is a problem in any 3-D reconstruction method employing two imaging projections. Third, the high spatial and temporal resolution of DSA makes the 3-D information derived from these images superior to information from tomographic techniques such as MRI and CT. In general, the pixel size in DSA images is smaller than that in MRI and CT images. Also, the time to acquire DSA images is generally equal to or shorter than that required for MRI or CT images. This is important in cardiac radiography, where moving vessels cause blurring of the image. Fourth, the hardware implementation of this method in, for example, digital cardiac angiography equipment allows real-time 3-D reconstruction of moving coronary vessels, and would be helpful in interventional procedures such as coronary angioplasty.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a flow chart illustrating the processing steps in the determination of a complete 3-D vascular structure of step 4 shown schematically in FIG. 1;

FIG. 7 is an illustration of the images shown in FIG. 6 with a vessel segment illustrated between two selected bifurcations and in which corresponding centerline points are indicated as well as an example of how the vessel segment might appear in 3 dimensions.

FIG. 15a, 15b, 16a, 16b and 16c are schematic perspective views illustrating various geometrical parameters used as variables in a computer simulation study performed to test the feasibility and accuracy of the method of the invention;

FIG. 17 is a table showing the results of the computer simulation study; and

DESCRIPTION OF THE PREFERRED EMBODIMENTS

Figure 1:
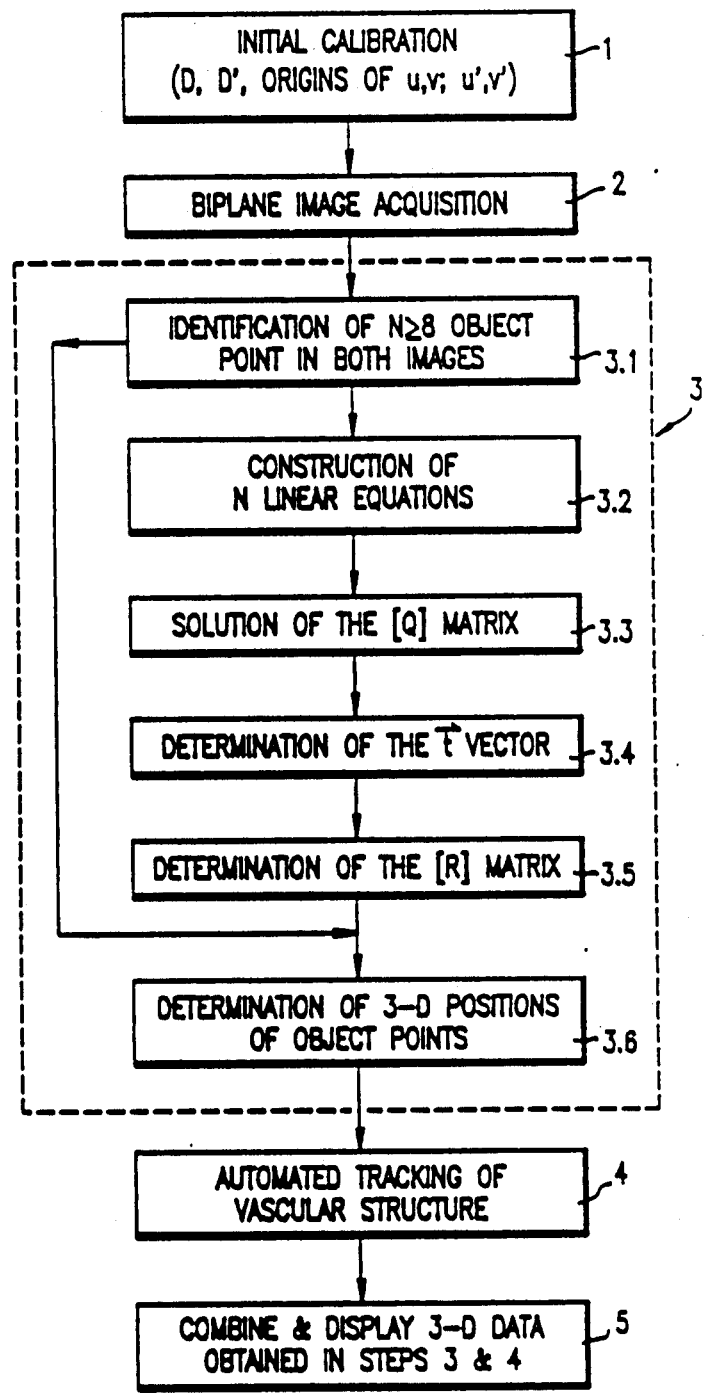
FIG. 1 is a schematic block diagram illustrating an overview of the processing steps performed according to the invention.

Referring now to the drawings, and more particularly to FIG. 1 thereof, implementation of this invention involves five basic steps:

Step (1) Initial calibration of the origins of the image coordinate systems uv and u'v', and of the distance between the x-ray source (x-ray focal spot), and the image plane, D and D'. This is accomplished using the calibration device described in relation to FIGS. 13 and 14 hereinafter. Note that although this calibration procedure is required, it is only done once for a given imaging system. It does not need to be repeated for different imaging geometries, as long as the relative positions of the x-ray focal spot and the image plane are maintained. The need for calibration may be obviated altogether in digital systems which are designed to incorporate the present invention.

Step (2) Acquistion of two digital biplane images of the object. This is accomplished using the setup illustrated in FIG. 8, wherein the lateral (LAT.) x-ray generator control, 122, and the AP (P) x-ray generator control, 124, control x-ray production in x-ray tubes, 102 and 104, respectively. Images of the object (or patient), 100, are acquired by image intensifier-TV (I.I.-TV) systems, 106 and 108. These images are digitized by A/D converters, 110 and 112, and are stored in the host computer, 114.

Step (3) Referring again to FIG. 1, identification of 8 (or more) points in the object which appear in both images, 3.1. These points may be selected manually, or with some automated detection scheme yet to be developed. These points would likely correspond to bifurcation points in the vasculature or to easily identifiable features on the vessels. From the N selected point, N linear equations are derived in terms of nine unknown q values, 3.2 The resultant [Q] matrix is then solved 3.3, followed by determination of the $\bar{t}$ vector (axis translation vector described hereinafter), 3.4, followed by determination of the [R] matrix (rotation matrix), 3.5, also described hereinafter. Step 3 is then completed by determining the 3-D positions of the object points, 3.6.

Subsequently, the 8 independent parameters which describe the biplane imaging geometry, as well as the 3-D positions of the object points, are automatically determined. The mathematics of this step are described in complete detail later in this document. Knowledge of the 8 independent parameters allows calculation of the 3-D positions of any object points whose coordinates can be identified in both images.

Step (4) Automated tracking of the vascular structure between the bifurcation points selected in Step 3. Subsequent to this, the automated correlation of many points along the vasculature in the two images, followed by calculation of the 3-D positions of each of these correlated points.

Figure 8:
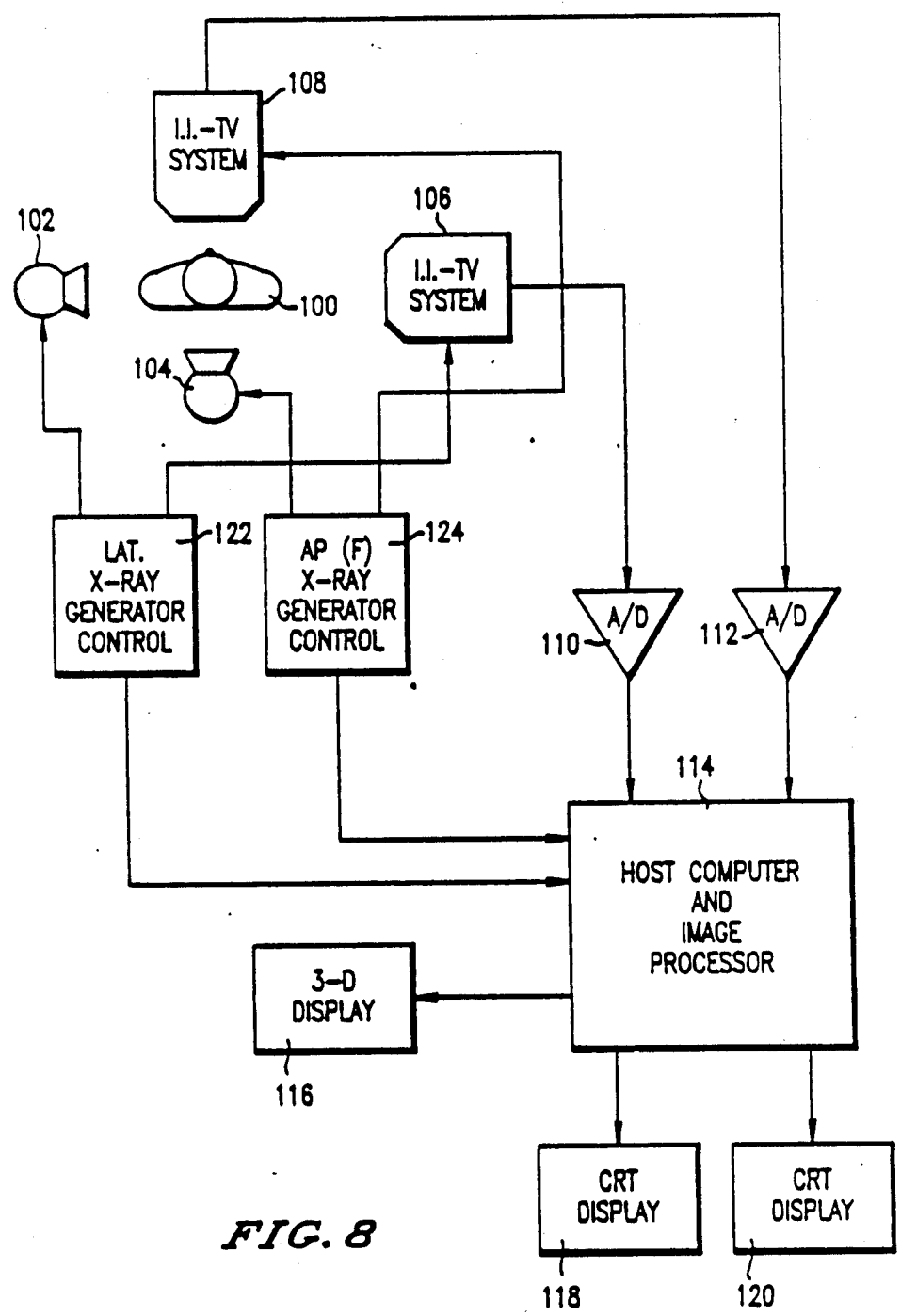
FIG. 8 is a schematic block diagram of an implementation of the invention for the determination of 3-D structure in a biplane digital angiographic system.

Step (5) Combination of the 3-D structure data of the object obtained in Steps 3 and 4. Referring now to FIG. 8, the presentation of the entire connected vascular structure on CRT displays, 118 and 120, in a projection format, from any desired orientation is possible. The vascular structure data could also be presented on a more advanced, true 3-D display, 116, for example a vibrating mirror display. Other manipulations of the 3-D data, such as rotation of the vessel structure in time on the CRT displays, 118 and 120, are possible.

Figure 2:
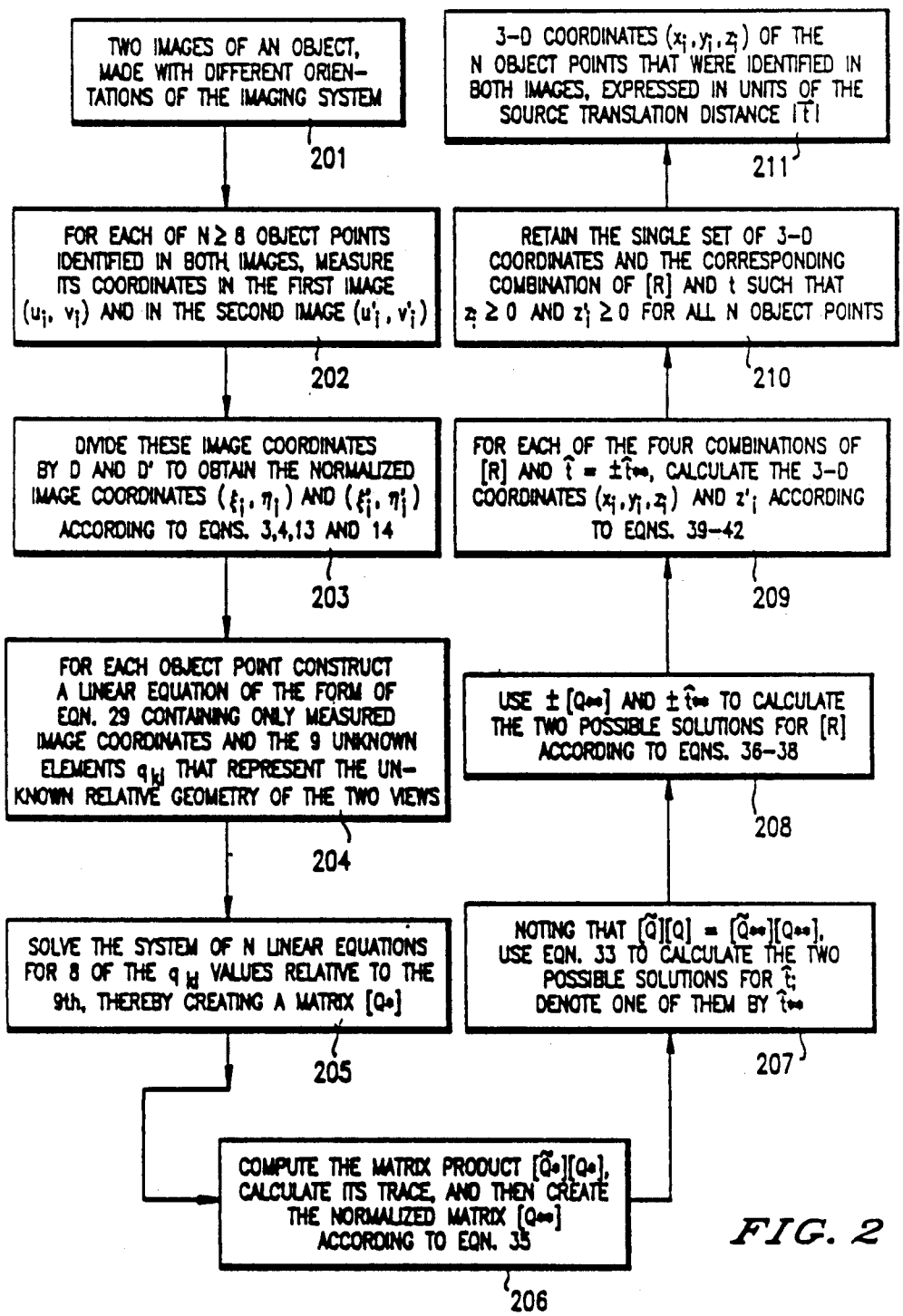
FIG. 2 is a flow chart providing an overview of processing steps to obtain 3-D positions of object points and the geometric imaging parameters.
Figure 3A:
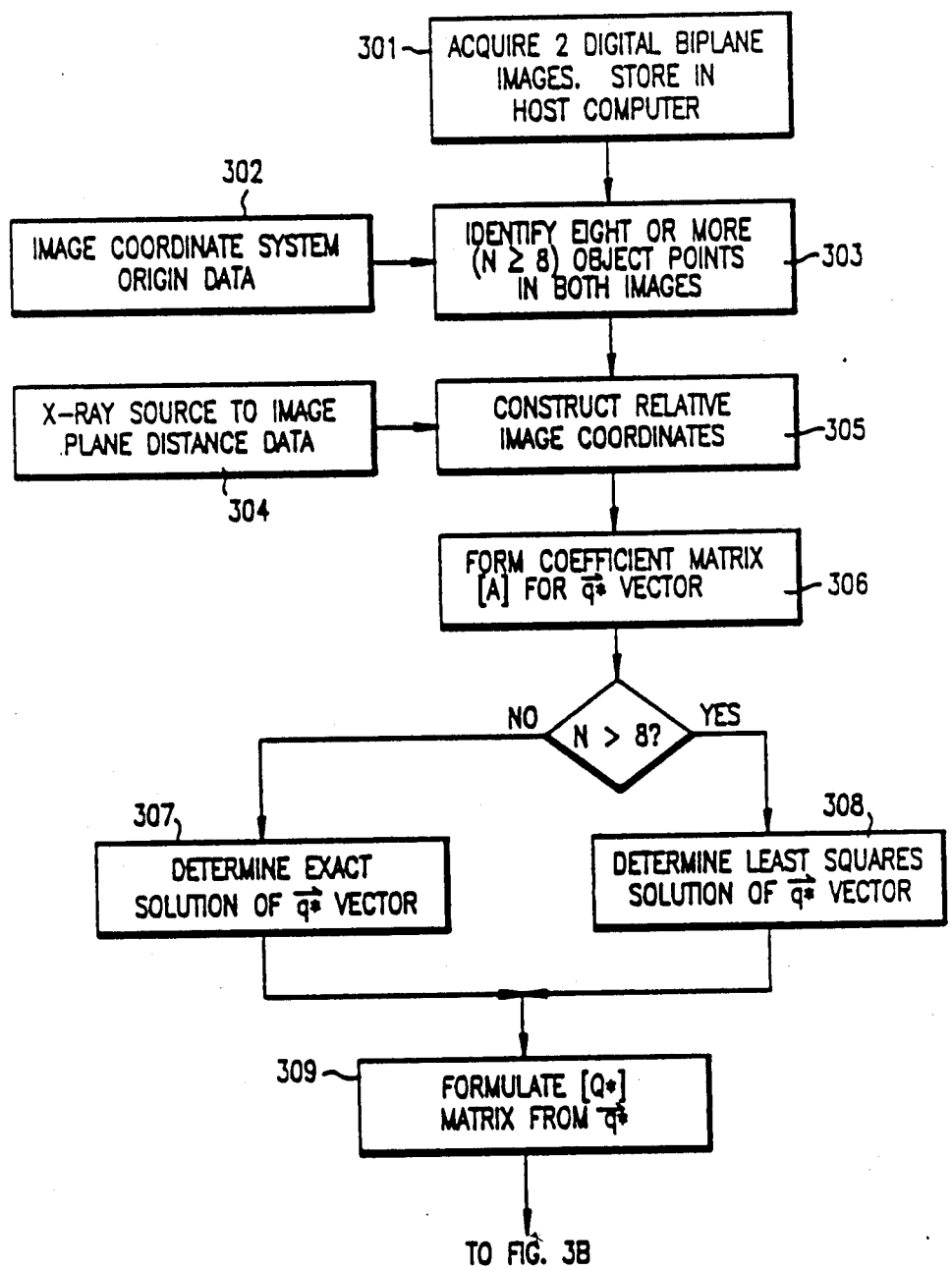
FIG. 3 is a flow chart illustrating in detail the processing steps performed in the determination of 3-D positions of object points and of the independent geometric imaging parameters.
Figure 3B:
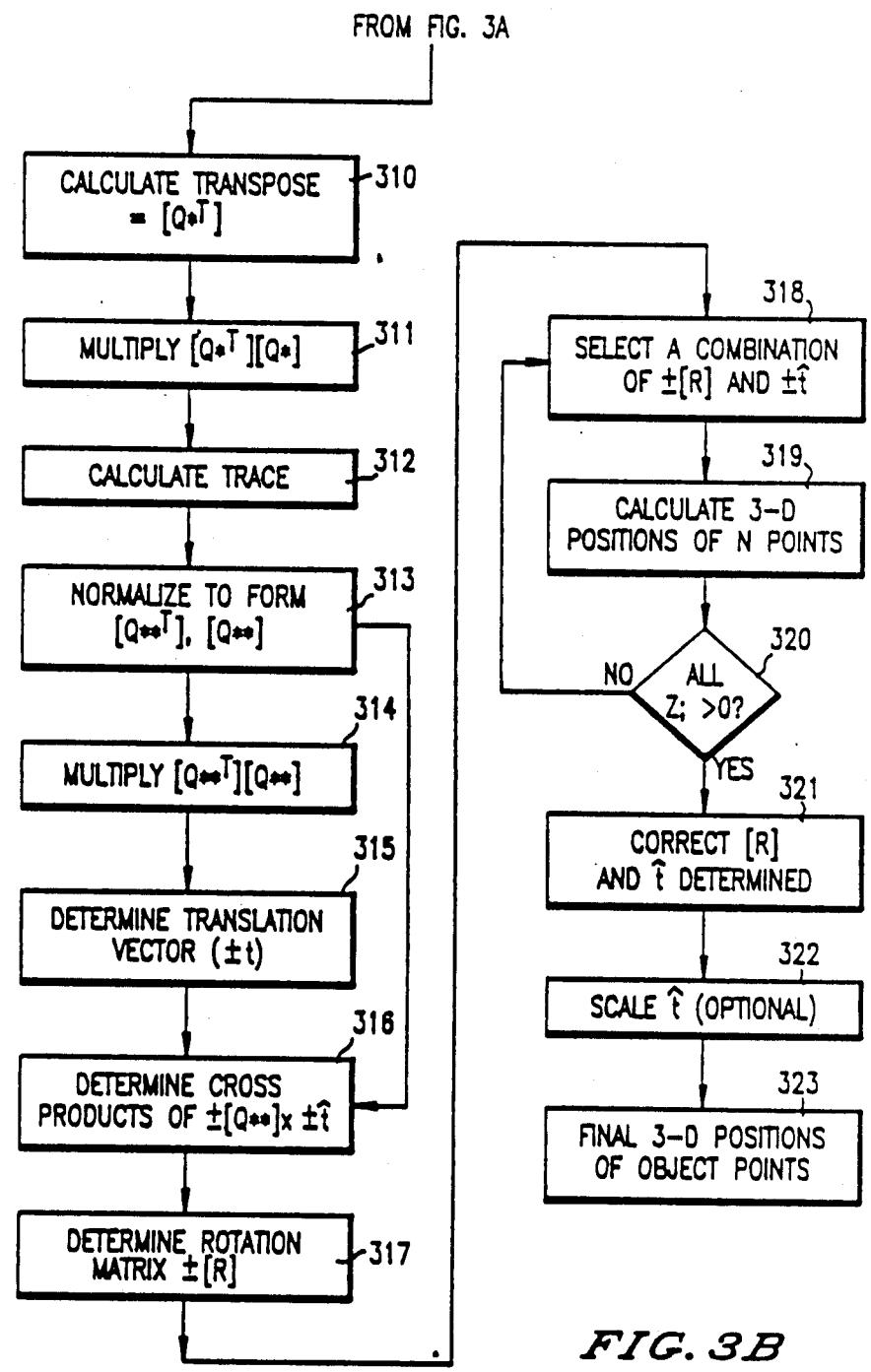

The operations of Steps 2 and 3 are shown in the flow chart of FIG. 2 and in somewhat greater detail in the flow chart of FIG. 3. Step 4 is diagrammed in FIG. 4. Devices utilized for the 3-D structure display in Step 5 are diagrammed in FIG. 8. Step 1 will now be described in more detail.

Figure 5:
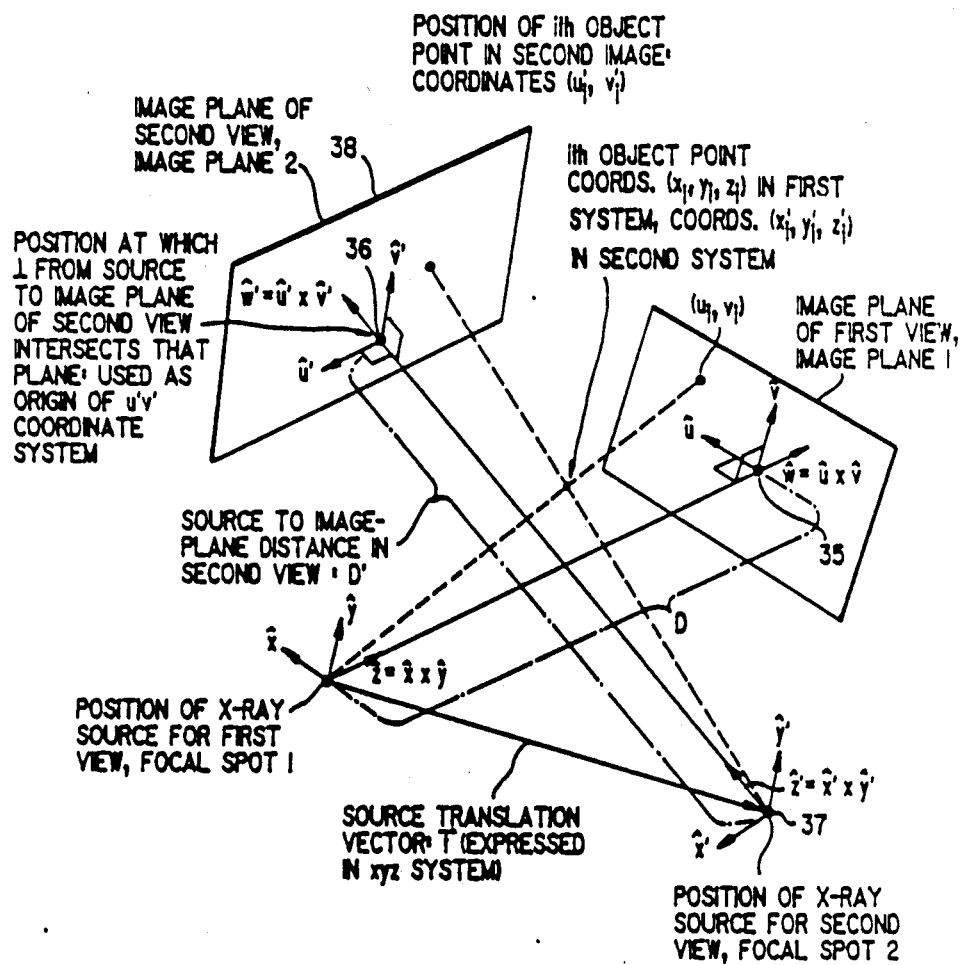
FIG. 5 is a schematic perspective view illustrating the geometry and coordinate systems of the biplane imaging system.

Step (1) Referring to FIG. 1, the procedure and device utilized provide two types of information that are required for performance of the method of the present invention. First, the perpendicular distances D, D' between the respective imaging planes and the respective x-ray source, or focal spot, are determined. (See FIG. 5 which shows the geometry and coordinate systems.) D, D' may also be measured using a "yardstick" which is often present on digital imaging devices. Once the distance D, D' are determined, they usually can be kept constant for most imaging situations and do not have to be measured again. Secondly, the points on the imaging planes, where a perpendicular line extending from the x-ray focal spot to the imaging plane intersects the imaging plane, 35 and 36 in FIG. 5, are determined. These points are equivalent to the origins of the coordinate systems of the digital images. These also need be measured only once for a given imaging system. In imaging systems incorporating the present invention, the construction of the digital system could be designed to ensure that the origins of the coordinate systems would be in the center of the image matrix, and this calibration could be eliminated.

Figure 13:
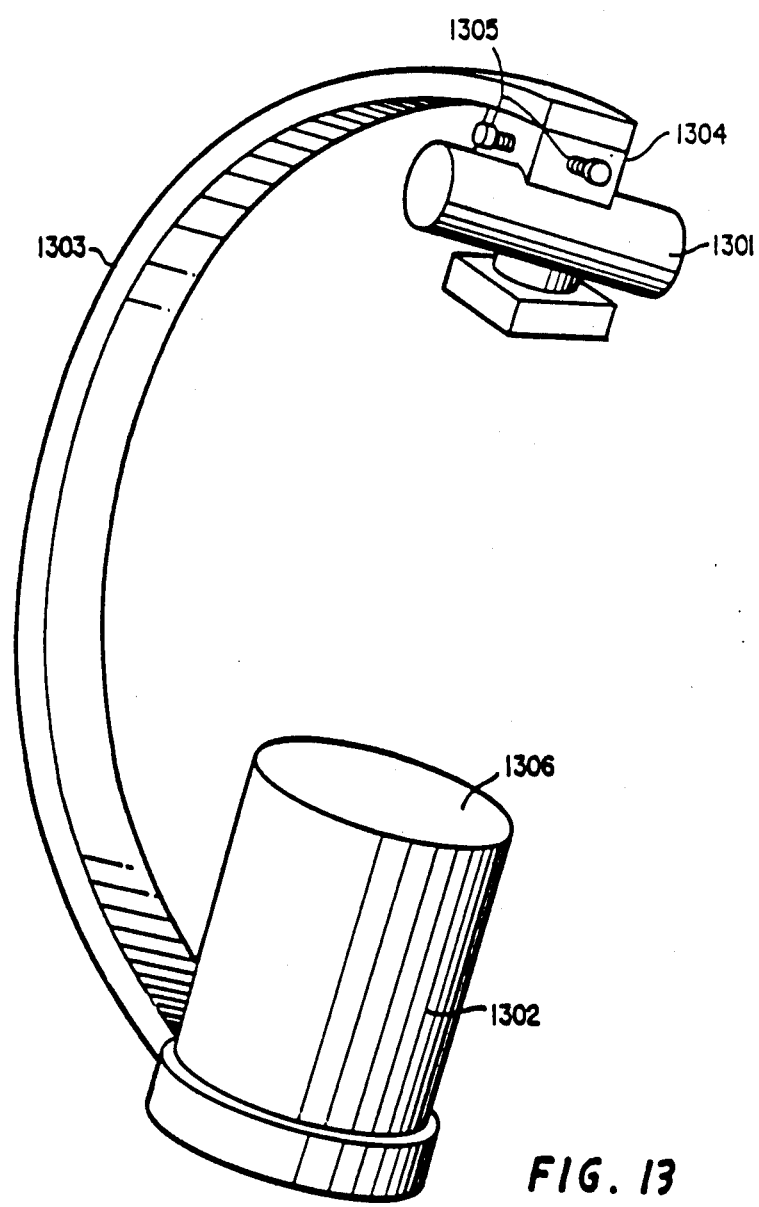
FIG. 13 is a schematic diagram of one x-ray tube and image-intensifier (I.I.) TV system in the biplane imaging system.
Figure 14:
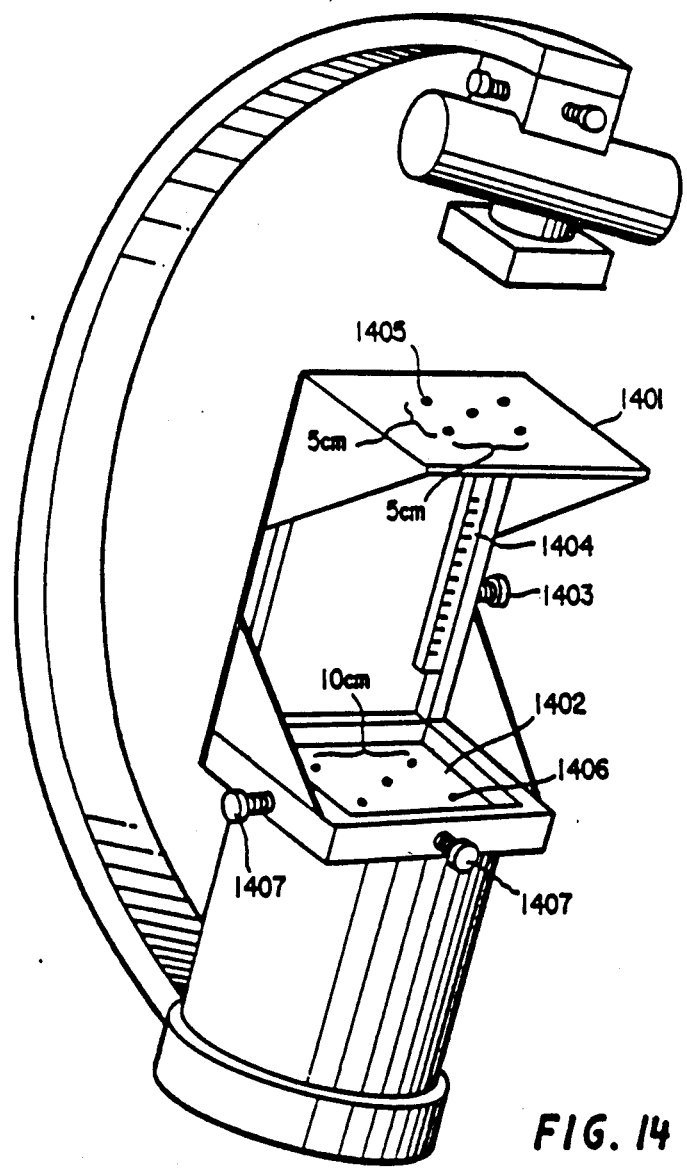
FIG. 14 is a schematic diagram showing the incorporation of the apparatus utilized to determine D, D' and the origins of the image coordinate systems, into the imaging system shown in FIG. 13.

Referring now to FIGS. 13 and 14, imaging system utilized is an x-ray tube, 1301, and image-intensifier (I.I.)-TV system 1302. The x-ray tube and the I.I.-TV system are attached to the two ends of a "C-arm" apparatus, 1303. The x-ray tube mount, 1304, includes micrometer screws, 1305, which allow the x-ray tube to be moved in a plane parallel to the I.I.-TV input plane, 1306.

The apparatus utilized to determine D, D' and the origins of uv and u'v' coordinate systems is illustrated systems is illustrated in FIG. 14. The apparatus includes a top plate ,1401, and a bottom plate, 1402, which are parallel to each other. A similar device has used for of x-ray tube focal spots (see: doi eral., Medical Physics 1975; 2: 268). The distance between the two plates is adjustable with a micrometer screw, 1403, and is indicated on a ruler attached beside the micrometer screw, 1404. The top plate, made of 3 mm thick aluminum, contains 5 pinholes, each 0.5 mm in diameter, 1405. Four pinholes make a 5 cm square, and one pinhole is at the center of the square. The bottom plate is made of 3 mm thick plastic, and contains 5 lead shots 1.0 mm in diameter, 1406. Four shots make a 10 cm square, and one shot is at the center of the square. Thus, the large square in the bottom plate is twice the size of the small square in the top plate. The structure holding the plates is constructed to ensure that the centers of the top and bottom squares lie on a line perpendicular to the plates and that the sides of the squares on the top and bottom plates are parallel. This alignment device is attached to the input surface of the I.I. by holding clamps. The position of the pair of plates parallel to the I.I. input plane can be adjusted by two micrometer screws attached to the base of the apparatus, 1407.

The sliding x-ray tube mount and the apparatus are used in a procedure that involves two steps.

(1) First, the location in the image of the origin of the image coordinate system is determined. This origin corresponds to the location on the I.I.-TV input plane where a line perpendicular to the I.I.-TV input plane intersects the I.I.1-TV input plane. This may be accomplished initially by observation of fluoroscopic images or digital images obtained with the x-ray tube operated at approximately 80 kVp in the pulse mode. When the initial x-ray exposure is made, the image displayed on a CRT monitor shows five bright spots corresponding to the x-ray beams transmitted through the five pinholes, and also five dark spots corresponding to the shadows cast by the five lead shots. Since the half-value layer of an 80 kVp x-ray beam in aluminum is approximately 3 mm, the x-ray intensity that passes through the pinholes to form the bright spots will be approximately twice the x-ray intensity that is responsible for the uniform background observed on the CRT monitor. On the other hand, due to x-ray absorption of the lead spheres, the x-ray intensity responsible for the dark spots observed on the CRT monitor will be only about 0.05% of the x-ray intensity that produces the uniform background. Therefore, the bright and dark spots can be distinguished clearly from the uniform background and from each other.

The origin of the image coordinate system is determined by adjustment of either the micrometer screws at the base of the alignment device, or the micrometer screws in the x-ray tube mount, so that the bright spot from the central pinhole is exactly superimposed on the shadow cast by the central lead shot. The location of superposition in the digital image matrix is the origin of the image coordinate system. When these adjustments are completed, the focal spot is located on the line perpendicular to the I.I. input plane that passes through the element of the digital image matrix on which the central bright and dark spots are superimposed.

The second step determines the perpendicular distance between the x-ray tube focal spot and the I.I. input plane. The vertical position of the top plate of the alignment device is adjusted to match the locations of the four non-central bright spots to the locations of the four non-central dark spots. When these adjustments are completed, the distance from the focal spot to the bottom plate is equal to twice the distance from the top plate to the bottom plate. If the distance from the bottom plate to the I.I. input plane is not negligibly small, it can be estimated separately and added to the distance from the focal spot to the bottom plate to yield distance from the focal spot to the I.I. input plane, D.

This device and procedure described must be applied to both x-ray tube and I.I.-TV system pairs in the digital imaging system. In this way, the distances D and D', as well as the origins of the image coordinate systems uv and u'v', are determined.

In the following, and referring again to FIG. 1, is a qualitative description of the processes involved in Step 3.

Figure 6B:
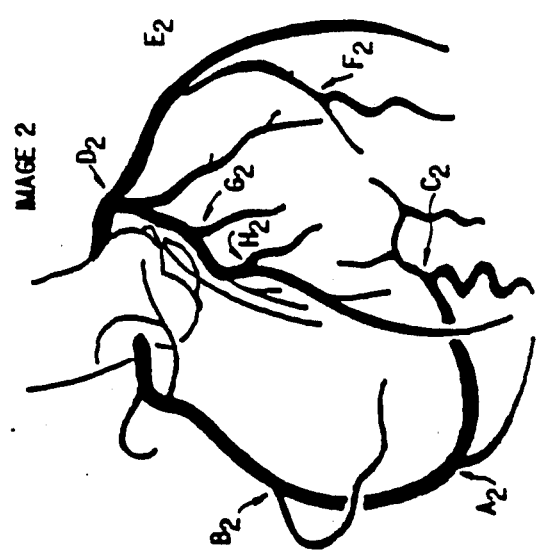
FIG. 6 is an illustration of two coronary angiographic images, with 8 (A-G) vessel bifurcation points selected, as well as an example of the calculated 3-D positions of a set of selected object points.
Figure 6A:
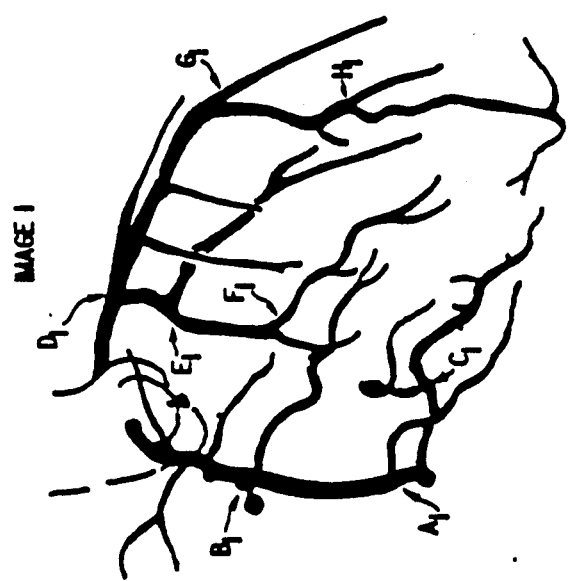

After the two digital images are obtained and stored in the image memory, 8 (or more) easily identifiable object points appearing in both images are selected. As an example, an operator may select points using a cursor to specify the image coordinates of each object point. An example of selected points in two radiographic images, is shown in FIG. 6. The image coordinates of the selected points are relative to the origin of the image coordinate system, which was measured in Step 1 described hereinabove. If more than 8 points are selected, the mathematics in the solution of the [Q] matrix, 3.3 in FIG. 1, are overdetermined, and a least-squares solution (See FIG. 3, 308) is employed. This least-squares solution reduces the effects of measurement errors in the selected image coordinates of individual points. If the selected points correspond to bifurcation points on the vessels, subsequent determination of the entire vascular structure in step 4 is easier to accomplish.

As mentioned above, a complete description of the concepts and the mathematics behind the determination of the 8 independent parameters from the image coordinates of 8 (or more) points is provided hereinafter. However, it is helpful to summarize the basic concepts here. To begin, it is first observed that there exists an inherent redundancy in biplane imaging. Specifically, for every object point of unknown 3-D position there exist 4 knowns and 3 unknowns the 4 knowns being the image coordinates $(u, v)$ and $(u', v')$ of the point appearing in the two images, and the 3 unknowns being the $x$, $y$, $z$ coordinates of the object in 3-D space. This observation allows one to conclude that some information concerning the geometry of the biplane imaging system may be gleaned from the 4 image coordinates of an unknown object point.

The second observation is that, if the input quantities described in Step 1 above are known, the biplane imaging system may be completely described by 8 basic parameters. These parameters describe the rotation and translation involved in transforming one of the imaging views into the other. Thus, the goal of Step 3 is to determine these 8 parameters using the redundancy described above.

If one redundancy is obtained with each object point identified in both views, then it follows that a minimum of 8 object points must be identified to determine the 8 basic parameters of the biplane imaging system. If more than 8 points are identified, the 8 basic parameters are themselves overdetermined, and may be calculated using a least-squares method. Once the 8 parameters are determined, the biplane imaging system is described completely, and the 3-D position of any object point which appears in both views can be easily calculated.

Next described is the method for determination of the 8 basic parameters that are determined from the known image coordinates of 8 (or more) object points in Step 3. In brief, the image coordinates of each object point are first scaled using the distance between the x-ray focal spot and the imaging plane, which was measured in Step 1. Combinations of the scaled image coordinates of a single point then serve as coefficients in a single linear homogeneous equation in 9 unknowns. The 9 unknowns are themselves combinations of the 8 basic parameters. At least 8 object points are selected, so at least 8 linear homogeneous equations are formulated. The matrix of the coefficients for the 9 unknowns for all the selected object points is referred to hereafter as the [A] matrix. Because all of these equations are equal to zero, it is mathematically possible to solve only for 8 unknowns relative to the 9th. referring to FIG. his is accomplished using an exact solution, 307, or a least squares solution, 308. Once the 8 unknowns are determined relative to the 9th, the 8 basic parameters of the system are determined from these 8 unknowns, and the 3-D positions of the selected object points may be easily calculated from their image coordinates and the 8 basic parameters.

The following is a detailed description of the techniques employed according to the invention to determine 3-D positions of object points without prior knowledge of the biplane imaging geometry.

Here is presented the detailed mathematical analysis of the method used to determine the 3-D positions of eight or more object points as well as to determine the geometry of the biplane imaging system, from two two-dimensional (2-D) radiographic projection images made with x-ray sources located at different positions, as in biplane angiography.

The technique is based on the following assumptions:

(1) Different x-ray source positions—and for the general case, different orientations of the image recording plane—are used for the two 2-D images. The use of different recording planes for the two images distinguishes "biplane" radiography from "stereo" radiography, in which both images are recorded in the same plane.

(2) The perpendicular distances from the x-ray source positions to the recording planes of the 2-D images are known. In general, these distances may be different. The method for determining these distances is described in Step 1 hereinabove and in relation to FIGS. 13 and 14.

(3) In each of the two 2-D images, one can determine the point at which the line from the x-ray source perpendicular to the image recording plane intersects that plane. The method of determining this point in each respective image recording plane is described in Step 1 hereinabove and in relation to FIGS. 13 and 14.

(4) Within each image plane, the orientation of two orthogonal coordinate axes (defined by the orthogonal vectors $\hat{u}$ and $\hat{v}$ in one image and $\hat{u}'$ and $\hat{v}'$ in the other) may be chosen arbitrarily, but in such a way that the vector cross products $\hat{w} = \hat{u} \times \hat{v}$ and $\hat{w}' = \hat{u}' \times \hat{v}'$ point away from the x-ray sources.

(5) For each of 8 or more points in the object, one can determine the corresponding image point coordinates in both 2-D images, where corresponding image point coordinates are defined hereinabove. If the images are formed by an image intensifier (I.I.)-TV system, for example, the image coordinates are assumed to have been corrected for distortion, such as "pincushion" distortion, where pincushion distortion is defined by nonlinear warping of the image coordinates resulting from a curved image recording plane, such as the curved surface of an I.I. The image point coordinates must be expressed in the same units as the distance between the source and the image recording plane; hence, in digital imaging, the pixel dimensions of the image must be known.

If and only if the absolute scale of the 3-D object is to be determined, one must assume also that:

(6a) The scalar distance between the two x-ray source positions is known;

(6b) the scalar distance between two object points identifiable in both views is known.

First, the relationship between the 3-D position of any point in the object and the 2-D coordinates of the image of that point in the two images is formulated.

Figure 9:
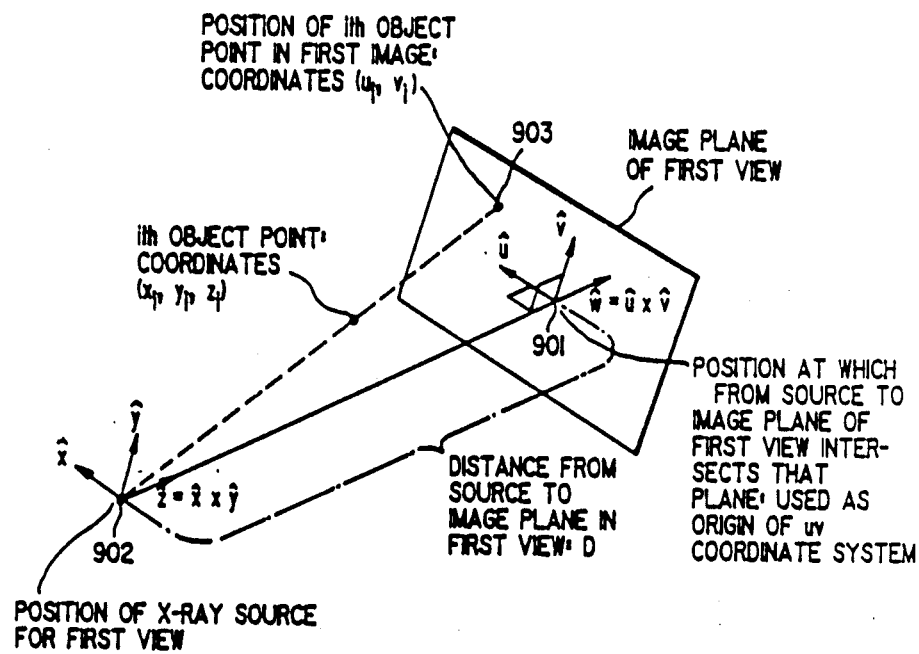
FIG. 9 is a schematic perspective view illustrating one of the biplane views shown in FIG. 5.

First, consider the geometry of one of the views, shown in FIG. 9:

Let $\hat{u}$ and $\hat{v}$ represent orthogonal unit vectors that indicate the directions of the u-axis and the v-axis, respectively, of the image coordinate system chosen for the first image. Without loss of generality, it is assumed that the unit vector $\hat{w}$ defined by the vector cross product $\hat{w} = \hat{u} \times \hat{v}$ points away from the position of the x-ray source. The origin of the uv coordinate system, 901, is taken to be the point at which the line from the x-ray source perpendicular to the image recording plane intersects that plane; according to assumption #3, this image point is known.

The coordinates of any point in the 3-D object space can be expressed by defining an xyz coordinate such that:

the origin of the xyz system, 902, is located at the x-ray source position used in exposing the first image; and the directions of the x-, y-, and z-axes are the same as those of the u-, v-, and w-axes, respectively. Thus, the axes of the xyz system are indicated by unit vectors $\hat{x}$, $\hat{y}$, and $\hat{z}$ that point in the directions of $\hat{u}$, $\hat{v}$, and $\hat{w}$, respectively.

If the 3-D coordinates of a particular object are expressed in the xyz system as $(x_i, y_i, z_i)$, then it is easy to show trigonometrically that the 2-D coordinates of that point, 903, in the first image are given by $$u_i = D\, x_i/z_i \quad [\text{Eqn. 1}]$$
$$v_i = D\, y_i/z_i \quad [\text{Eqn. 2}]$$

where D is the distance between the x-ray source and the image plane, shown in FIG. 9. In units of this distance, the image coordinates of the ith object point are expressed by $$\xi_i = u_i/D \quad [\text{Eqn. 3}]$$
$$= x_i/z_i$$

and $$\eta_i = v_i/D \quad [\text{Eqn. 4}]$$
$$= y_i/z_i$$

respectively. Equations 3 and 4 can be written together in matrix notation as $$\begin{bmatrix} \xi_i \\ \eta_i \\ 1 \end{bmatrix} = k \begin{bmatrix} x_i \\ y_i \\ z_i \end{bmatrix} \quad [\text{Eqn. 5}]$$

where k is a dummy scalar variable, which the third row of Eqn. 5 shows must equal $1/z_i$. Equation 5 can be written more concisely as $$\vec{\xi}_i = k\, \vec{x}_i \quad [\text{Eqn. 6}]$$

where $$\vec{x}_i = \begin{bmatrix} x_i \\ y_i \\ z_i \end{bmatrix} \quad [\text{Eqn. 7}]$$

and $$\vec{\xi}_i = \begin{bmatrix} \xi_i \\ \eta_i \\ 1 \end{bmatrix} \quad [\text{Eqn. 8}]$$

Expressions similar to those derived above are obtained from the image coordinates $(u_i', v_i')$ of the ith point in the second image. By analogy to Eqns. 1 and 2:

$$u_i' = D'\, x_i'/z_i' \quad [\text{Eqn. 9}]$$
$$v_i' = D'\, y_i'/z_i' \quad [\text{Eqn. 10}]$$

where referring to FIG. 5, D' is the distance between the x-ray source, 37, and the image plane, 38, in the second view, and where $(x_i', y_i', z_i')$ are the coordinates of the ith object point expressed in the x'y'z' system of the second view. By analogy to Eqn. 6, we have $$\bar{\xi}_i' = k' \bar{x}_i'  \quad [\text{Eqn. 11}]$$

where k' is a dummy scalar variable equal here to $1/z_i'$ and where the vectors $\bar{x}_i'$ and $\bar{\xi}_i'$ are defined as $$\bar{x}_i' = \begin{bmatrix} x_i' \\ y_i' \\ z_i' \end{bmatrix} \quad [\text{Eqn. 12}]$$

and $$\bar{\xi}_i' = \begin{bmatrix} \xi_i' \\ \eta_i' \\ 1 \end{bmatrix}. \quad [\text{Eqn. 13}]$$

where, by analogy to Eqns. 3 and 4, the normalized image coordinates $\xi_i'$ and $\eta_i'$ in Eqn. 13 are given by:

$$\bar{x}_i = \begin{bmatrix} x_i' \\ y_i' \\ z_i' \end{bmatrix} \quad [\text{Eqn. 12}]$$

and $$\bar{\xi}_i = \begin{bmatrix} \xi_i' \\ \eta_i' \\ 1 \end{bmatrix}. \quad [\text{Eqn. 13}]$$

where, by analogy to Eqns. 3 and 4, the normalized image coordinates $\xi_i'$ and $\eta_i'$ in Eqn. 13 are given by:

$$\xi_i' = u_i'/D' \quad [\text{Eqn. 14}]$$
$$= x_i'/z_i'$$

and $$\eta_i' = v_i'/D' \quad [\text{Eqn. 15}]$$
$$= y_i'/z_i'$$

Thus, the 2-D coordinates of the ith object point in the first image are related to the 3-D position of that point when it is expressed in the xyz system, and the 2-D coordinates of the same object point in the second image are related to the 3-D position of that point when it is expressed in the x'y'z' system. However, both sets of image coordinates have not yet been related to the 3-D position of the object point when it is expressed in a single 3-D coordinate system.

To accomplish the latter end, a single coordinate system in which both the coordinates associated with the two views will be expressed. Alternatives include: (1) the xyz system; (2) the x'y'z' system; (3) some compromise between (e.g., the average of) the xyz and x'y'z' systems; or (4) a system based on an external ("laboratory") frame of reference. In the following, the xyz system is arbitrarily chosen. Clearly, the distinction between the xyz and x'y'z' systems is trivial, since the distinction between the "first" and "second" views is arbitrary. Use of a compromise system seems only to complicate the resulting mathematical expressions, whereas use of an external reference frame requires additional information concerning the geometrical relationships of the two views and the external frame. By using the xyz (or x'y'z') system as a reference frame, the relationship between the three dimensional structure of the object and the two images can be expressed without concern as to how the object is positioned or oriented in some external frame of reference.

Note that the xyz system can be transformed into the x'y'z' system by:
(1) translation of the origin of the xyz system to the location of the origin of the x'y'z' system, and then:
(2) rotation of the translated xyz system rigidly so that the unit vectors $\hat{x}, \hat{y}$, and $\hat{z}$ align with the unit vectors $\hat{x}', \hat{y}'$, and $\hat{z}'$, respectively.

This sequence of operations is represented in terms of matrix algebra by $$\begin{bmatrix} x_i' \\ y_i' \\ z_i' \end{bmatrix} = \begin{bmatrix} r_{11} & r_{12} & r_{13} \\ r_{21} & r_{22} & r_{23} \\ r_{31} & r_{32} & r_{33} \end{bmatrix} \left( \begin{bmatrix} x_i \\ y_i \\ z_i \end{bmatrix} - \begin{bmatrix} t_x \\ t_y \\ t_z \end{bmatrix} \right) \quad [\text{Eqn. 16}]$$

where $r_{kl}$ = the cosine of the angle between the kth unit vector of the x'y'z' system and the lth unit vector of the xyz system  [Eqn. 17]

and where the 3-D vector $$\bar{t} = \begin{bmatrix} t_x \\ t_y \\ t_z \end{bmatrix} \quad [\text{Eqn. 18}]$$

expresses, in the xyz system, the translation that moves the origin of the xyz system to the origin of the x'y'z' system, as shown in FIG. 5. Equation 16 can be written more concisely as $$\bar{x}_i' = [R](\bar{x}_i - \bar{t}) \quad [\text{Eqn. 19}]$$

where [R] is the 3×3 matrix with elements $r_{kl}$. Note for future reference that the kth row of [R] expresses the kth unit vector of the x'y'z' system in terms of the xyz system, whereas the lth column of [R] expresses the lth unit vector of the xyz system in terms of x'y'z' system.

From Equations 11 and 19 we obtain $$\begin{bmatrix} \xi_i' \\ \eta_i' \\ 1 \end{bmatrix} = k' \begin{bmatrix} r_{11} & r_{12} & r_{13} \\ r_{21} & r_{22} & r_{23} \\ r_{31} & r_{32} & r_{33} \end{bmatrix} \left( \begin{bmatrix} x_i \\ y_i \\ z_i \end{bmatrix} - \begin{bmatrix} t_x \\ t_y \\ t_z \end{bmatrix} \right) \quad [\text{Eqn. 20}]$$

which expresses the coordinates of the ith object point in the second image ($\xi_i'$ and $\eta_i'$) in terms of the 3-D position of the point in the xyz system (rather than in the x'y'z' system, as before). This vector equation can be written out and rearranged to yield the pair of scalar equations:

$(r_{11} - r_{31}\xi_i')x_i + (r_{12} - r_{32}\xi_i')y_i + (r_{13} - r_{33}\xi_i')z_i$
$= (r_{11} - r_{31}\xi_i')t_x + (r_{12} - R_{32}\xi_i')t_y + (r_{13} - r_{33}\xi_i')t_z$  [Eqn. 21] and $(r_{21} - r_{31}\eta_i')x_i + (r_{22} - r_{32}\eta_i')y_i + (r_{23} - r_{33}\eta_i')z_i$
$= (r_{21} - r_{31}\eta_i')t_x + (r_{22} - r_{32}\eta_i')t_y + (r_{23} - r_{33}\eta_i')t_z$  [Eqn. 22]

Analogous expressions for the coordinates of the ith object point in the first image in terms of the xyz system are provided by Eqns. 3 and 4, which can be rewritten as:

$$x_i - (\xi_i)z_i = 0 \quad \text{[Eqn. 23]}$$

$$y_i - (\eta_i)z_i = 0 \quad \text{[Eqn. 24]}$$

Equations 21 through 24 imply:

(1) If the geometrical relationship between the two imaging views (i.e., the elements $r_{kj}$ of the rigid-rotation matrix [R] and the elements ($t_x$, $t_y$, $t_z$) of the translation vector $\vec{t}$) were known, and if the image coordinates ($\xi_i$, $\eta_i$) and ($\xi_i'$, $\eta_i'$) of a particular object point (denoted by the subscript i) were known, then Eqns. 21 through 24 would represent four consistent linear equations with three unknowns—the three unknowns being the 3-D coordinates of the object point, $x_i$, $y_i$, and $z_i$—so one could solve for $x_i$, $y_i$ and $z_i$ by using any three of the equations. The remaining equation is redundant if (and only if) the geometrical relationship between the two views is known. Alternatively, if all but one of the elements in the matrix [R] or the vector $\vec{t}$ (which represent the parameters of the geometrical relationship between the two views) were known, it should be possible to use the four equations to solve for an unknown element of R] r $\vec{t}$ and for the object-point coordinates $x_i$, $y_i$, and $z_i$.

(2) If all but two of the elements in the matrix [R] and the vector $\vec{t}$ were known, and if the image coordinates ($\xi_i$, $\eta_i$) and ($\xi_i'$, $\eta_i'$) of two object points were known, then it should be possible to use the resulting eight equations with the form of Eqns. 21 through 24 to solve for the eight unknowns that exist in this situation: the two unknown elements of the matrix [R] and/or the vector $\vec{t}$; the 3-D coordinates ($x_1$, $y_1$, $z_1$) of one object point; and the 3-D coordinates ($x_2$, $y_2$, $z_2$) of the other object point.

(3) This argument can be extended to increasing levels of ignorance about the elements in the matrix [R] and the vector $\vec{t}$ (i.e., about the relative geometry of the two views). Each additional object point that can be identifed in both images increases the number of unknowns by three (the unknowns being the values of $x_i$, $y_i$, and $z_i$ for that point) but increases the number of equations by four, thereby allowing the possibility of determining one more unknown element in the matrix [R] or the vector $\vec{t}$. Thus, if the matrix [R] nd the vector $\vec{t}$ contain N independent elements and if all of these elements were unknown, identification of N points in both images would seem to allow determination of all of the elements in the matrix [R] and the vector $\vec{t}$ and the 3-D coordinates ($x_i$, $y_i$, and $z_i$) of all of the object points identified in both images.

With regard to observation #3 immediately above, it is noted that, although the rotation matrix [R] contains 9 elements, only 5 of these elements are independent. This is because any four elements of a rigid rotation matrix [R] can be determined from the other five elements, because the rows (and columns) of R] represent orthogonal unit vectors such that any row (or column) is given by a vector cross-product of the other two rows (or columns). Hence, only five of the nine elements of [R] are independent. It is also noted that the translation vector $\vec{t}$ contains 3 elements, all of which are independent. Therefore, there exists a total of 8 independent elements which must be determined in order to completely specify the geometrical relationship between the two imaging views. Thus, observation #3 suggests that if 8 object points were identified in both images, one can determine the geometrical relationship between the two imaging views, and subsequently determine the 3-D coordinates of those object points without having prior information concerning the geometrical relationship between the two views—i.e., without knowing the elements of [R] and $\vec{t}$ in advance. The matrix [R] and the vector $\vec{t}$ would be determined by this approach also. If more than 8 object points were identified in both images, the resulting system of equations would involve more equations than unknowns, presumably permitting a least-squares solution that would reduce the effects of random errors in measurements of the image coordinates ($u_i$, $v_i$) and ($u_i'$, $v_i'$).

The above argument ignores the fact that when the coordinates ($x_i$, $y_i$, $z_i$) of the 8 object points are unknown and some or all of the independent elements of [R] are unknow then 16 of the 32 equations to be solved (specifically, those that arise from Eqns. 21 and 22) are nonlinear in their unknowns. Therefore, since non-linear systems of 32 equations may not uniquely determine the values of 32 unknowns, it remains to be proven that a minimum of 8 points will suffice. This proof is provided hereinafter.

Figure 10A:
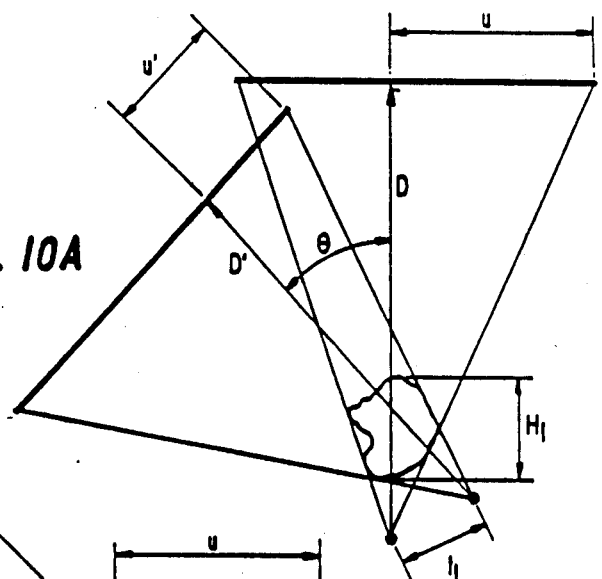
FIG. 10 is a schematic illustration of the inherent ambiguity of object scale, if the scale of the translation vector $\vec{t}$ is unknown.
Figure 10B:
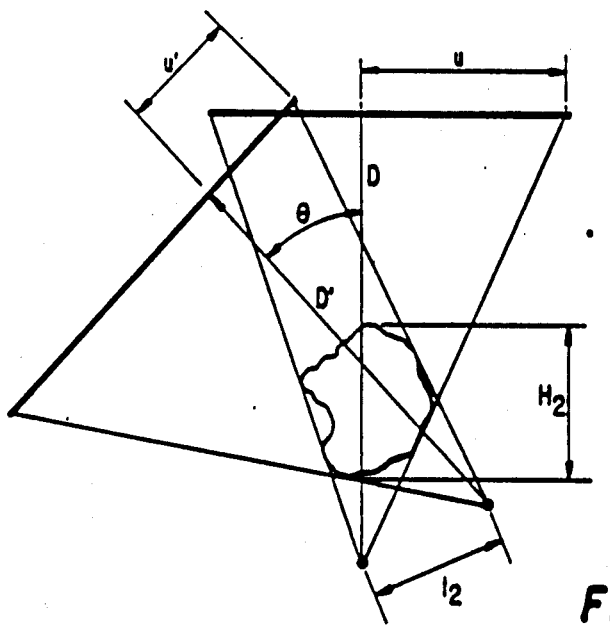

Examination of Eqns. 21 through 24 shows that the approach suggested above does not allow solution for the absolute scale of the object if the source translation distance (i.e., the magnitude of the source-translation vector $\vec{t}$) is unknown. To understand the validity of this assertion, and referring to FIG. 10, suppose that the x-ray source translation $\vec{t}$ and the 3-D positions of at least eight object points ($x_i$, $y_i$, $z_i$; N>8) were initially unknown and that a set of solution values for the 3-D positions of the object points and the elements of [R] and $\vec{t}$ have been obtained from the system of equations arising from Eqns 21 through 24 evaluated with the measured image coordinates ($\xi_i$, $\eta_i$) and ($\xi_i'$, $\eta_i'$) of each point. Now suppose that both sides of each of the N versions of Eqns. 21 through 24 are multiplied by any scale factor $\phi$ and that this factor is grouped with the terms ($x_i$, $y_i$, $z_i$) on the left sides of the equations and with the terms ($t_x$, $t_y t_z$) when they appear on the right sides. From Eqns. 21 through 24 it is seen that the quantities ($\phi x_i$, $\phi y_i$, $\phi z_i$) and $\phi t_x$, $\phi t_y$, $\phi t_z$) also solve the system of equations. Thus, in general, one can solve only for the scaled 3-D coordinates of the object points relative to the source translation distance, which is expressed by the magnitude of the source translation vector $\vec{t}$. This inherent ambiguity of the object scale is illustrated in FIG. 10. The x-ray source translations $\vec{t}_1$ and $\vec{t}_2$ and the sizes of the objects, $H_1$ and $H_2$, shown in FIG. 10, differ by a common scale factor, but the images produced on the imaging planes 1001 and 1003, as well as on 1002 and 1004, are identical. Therefore, it is impossible, using only information derived from image coordinates of object points, to determine the absolute scale of the object. The absolute scale of the object may be determined only if additional information is available. The additional information may be either: (i) the scalar distance between the two x-ray source positions (i.e., the absolute magnitude of the vector $\vec{t}$); or (ii) the absolute scalar distance between two object points that are identifiable in both images. In radiological applications, the latter distance can conveniently be determined from two small radiopaque markers which serve as object points, and which are separated by a known absolute distance. The radiopaque markers may be affixed to the surface of the patient during the imaging process, or may be attached to an intraarterial or intravenous catheter appearing in both images, or may be imbedded in a small ruler or lucite rod and imaged with the patient. Regardless of method by which the radiopaque markers are included in the images, the known absolute distance between the markers can be utilized to scale the magnitude of the translation vector $\bar{t}$. Once the absolute magnitude of the $\bar{t}$ is determined, as described hereinafter, the absolute scale of the object may be obtained.

In the method of the invention, the same translation vector $\bar{t}$ is assumed to be a unit vector. Therefore, one can assume in the following that:

$$|\bar{t}| = 1, \qquad \text{[Eqn. 25]}$$

thereby reducing the task to one of solving for the object point positions $(x_1, y_1, z_1; \ldots, N \geq 8)$ in units of the translation distance $|\bar{t}|$. Because Eqn. 25 indicates that $\bar{t}$ will be interpreted as a unit vector, it is hereafter written as $\hat{t}$ rather than $\bar{t}$.

In calculations described hereinafter, the absolute magnitude of the $\bar{t}$ vector is determined from the known absolute distance between the radiopaque markers, or from the measured absolute distance between the x-ray focal spots.

Next, the steps involved in the method to determine the 3-D coordinates of 8 or more object points, as well as the rotation matrix [R] and the translation vector $\bar{t}$, from the image coordinates of the object points, are described. To begin, and referring to FIGS. 2 and 3, it is noted that N object points are identified in both images, as shown in 202 and 03. The two sets of image coordinates $(u_i, v_i)$ and $(u_i', v_i')$, of each of the N points, where $N > 8$, are scaled by D or D', respectively, 203 and 305. Each set of scaled object coordinates produces a set of four equations with the form of Eqns. 21 through 24. If any three of these are solved for $x_i$, $y_i$, and $z_i$ in terms of the remaining quantities, and if these solutions are substituted into the fourth equation, one obtains an expression than can be written in matrix form as:

$$[\xi_i' \; \eta_i' \; 1] \underbrace{\begin{bmatrix} (r_3 y_i - r_2 t_z) & (r_1 t_z - r_3 t_x) & (r_2 t_x - r_1 t_y) \\ (r_3 y_i - r_2 t_z) & (r_1 t_z - r_3 t_x) & (r_2 t_x - r_1 t_y) \\ (r_3 y_i - r_2 t_z) & (r_1 t_z - r_3 t_x) & (r_2 t_x - r_1 t_y) \end{bmatrix}}_{= [Q]} \begin{bmatrix} \xi_i \\ \eta_i \\ 1 \end{bmatrix} = 0, \qquad \text{[Eqn. 26]}$$

where the matrix indicated by [Q] above is a 3×3 matrix containing elements, each of which are nonlinear combinations of the elements of the [R] matrix and $\hat{t}$ vector. Longuet-Higgins (Nature 1981; 293:133–135) made the observations that: (i) the 3×3 matrix [Q] defined in Eqn. 26 above is given by $$[Q] = [R][S] \qquad \text{[Eqn. 27]}$$

where [S] is the skew-symmetric matrix $$[S] = \begin{bmatrix} 0 & t_z & -t_y \\ -t_z & 0 & t_x \\ t_y & -t_x & 0 \end{bmatrix} \qquad \text{[Eqn. 28]}$$

and (ii) the kth row of [Q] is given by the vector cross-product $\hat{t} \times \hat{r}_k$, where $\hat{r}_k$ is the kth row of the rotation matrix [R]—i.e., the kth unit vector of the x'y'z' system expressed in the xyz system.

Equation 26 can be written out as $$(\xi_i'\xi_i)q_{11} + (\xi_i'\eta_i)q_{12} + (\xi_i')q_{13} + \qquad \text{[Eqn. 29]}$$

$$(\eta_i'\xi_i)q_{21} + (\eta_i'\eta_i)q_{22} + (\eta_i')q_{23} + (\xi_i)q_{31} + (\eta_i)q_{32} + (1)q_{33} = 0$$

where $q_{kl}$ represents the element in the kth row and th column of the matrix [Q] shown in Eqn. 26. In Eqn. 29, the quantities $\xi_i$, $\eta_i$, $\xi_i'$, and $\eta_i'$ are the measured, (i.e., known) scaled coordinates of the ith object point in the two images (after scaling by D or D', according to Eqns. 3, 14, 13 and 14), whereas the quantities $(q_{kl})$ represent combinations of the unknown elements of the rigid-rotation matrix [R] and the source translation vector $\hat{t}$. Equation 29 is a linear equation in 9 unknown elements $q_{kl}$, described in 204 in FIG. 2. For N object points identified in both images, there result N equations with the form of Eqn. 29. Note that: (i) all of these equations are linear with respect to the unknown quantities $(q_{kl})$; (ii) all of the linear coefficients (shown in parentheses in Eqn. 29) are known from the measured, scaled image coordinates. The linear coefficients appearing in Eqn. 29 form an N×9 matrix, which will hereinafter be referred to as the [A] matrix, for the N equations of the form of Eqn. 29.

Observe that all of the N equations of the form of Eqn. 29 are equal to zero. According to this observation, it is mathematically impossible to solve for all nine of the $q_{kl}$ terms on an absolute scale. Instead, it is possible only to solve for the values of any eight $q_{kl}*$ terms relative to the a (non-zero) ninth value. Hereinafter, the set of elements $q_{kl}$ will also be referred to as the $\hat{q}*$ vector. This is possible when N, the number of object points identified in both views, is greater than o equal to 8, and if at least 8 of the linear equations arising from the N points are linearly independent. Thus, if N≥8 object points be identified in both images, and if 8 of the linear equations arising from the N object points are linearly independent, then an exact solution, 205 and 307, of 8 of the elements of the $\hat{q}*$ vector relative to a ninth value, is possible. Some of the linear equations may not be linearly independent for certain highly symmetrical sets of object point positions. (See H. C. Longuet-Higgins, in *Image Understanding* 1984, S. Ullman, V. Richards, eds, Ablex Publishing Corp, Norwood, New Jersey.) However, such highly symmetrical sets of object points are extremely unlikely to arise in biological objects encountered in radiologic imaging, and thus eight of the linear equations arising from image coordinates of object points in this invention will almost always be all linearly independent.

Figure 11:
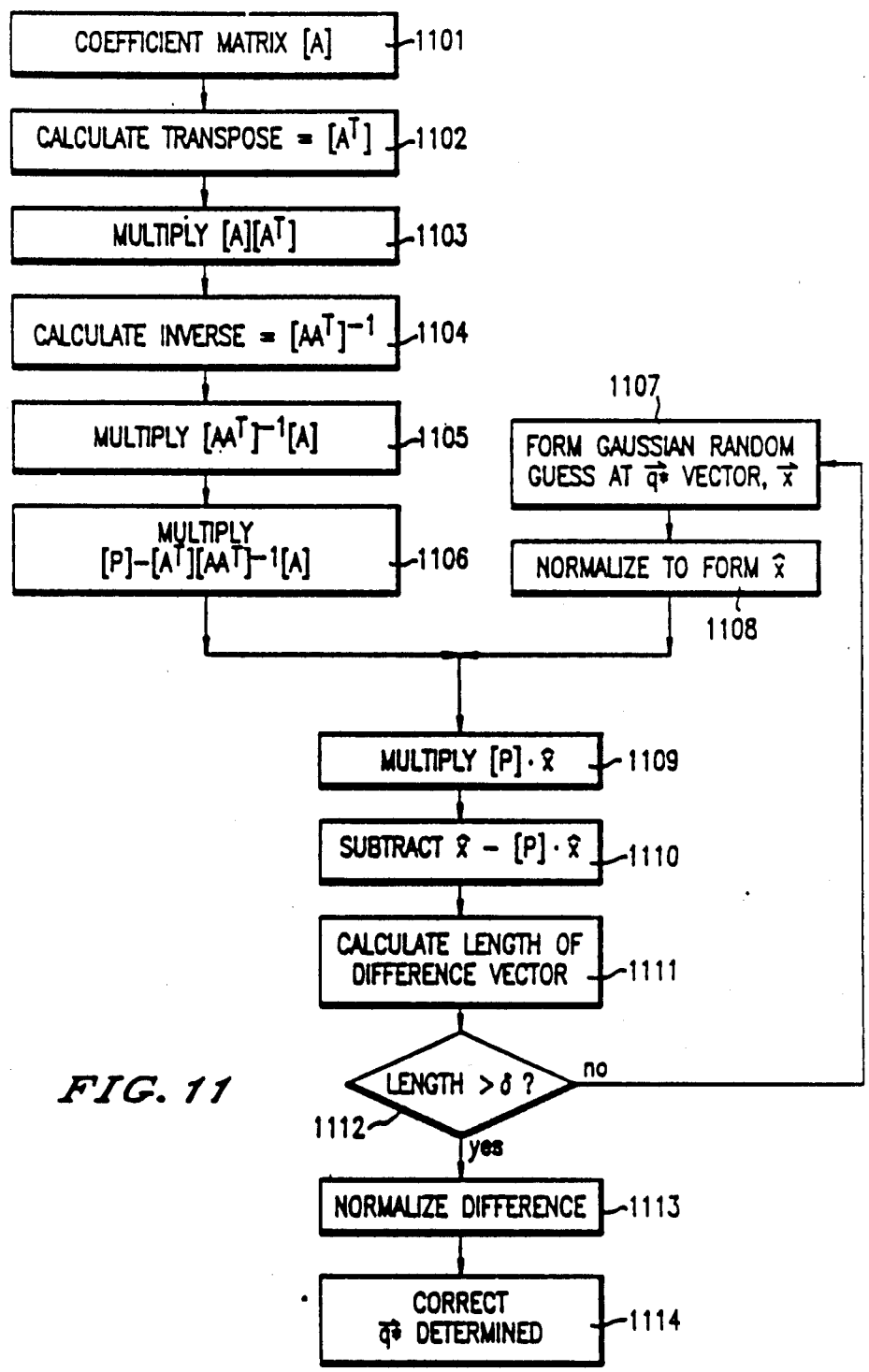
FIGS. 11 and 12 are flow charts illustrating in more detail the steps in determining the exact and least squares solutions of the $\vec{q}$ vector, respectively, as shown in FIG. 10.

In reference to FIG. 11, the steps involved in the exact solution of eight of the elements of the $\hat{q}*$ vector relative to a 9th value, are shown. The transpose of the coefficient matrix, [A], is determined, 1102. $[A^T]$ is then premultiplied by [A], which is the transpose of the [A] matrix, 1103, and this product matrix is inverted, 1104. Another product matrix is formed, 1105, and subsequently a final product matrix [P] is formed, 1106. Subsequently, random guesses for the nine elements of the $\dot{q}^*$ vector are generated using a gaussian random number generator, 1107, and the length of the random guess $\vec{x}$ vector is normalized to unit length, 1108. The unit length random guess vector, $\hat{x}$, is then multiplied by the product matrix [P], 1109, and the result is subtracted from $\hat{x}$, 1110. The length of the difference vector is determined, 1111, and if the length exceeds a cutoff value, 1112, (usually set equal to 0.001) then the length of the difference vector is normalized to unity, 1113, and the elements of the $\dot{q}^*$ vector are set equal to the elements of the normalized difference vector, 1114. If the length of the difference vector does not exceed the cutoff value, the importance of computer roundoff error in the calculation of the difference vector becomes large, and thus another random guess at the $\dot{q}^*$ vector is generated, 1107, and steps 1108-1112 are repeated until the length of the resulting difference vector exceeds the cutoff value. In this way, the correct values of the elements of the $\dot{q}^*$ vector, relative to a ninth value or scaling factor to be calculated as described hereinafter, are determined.

Figure 12:
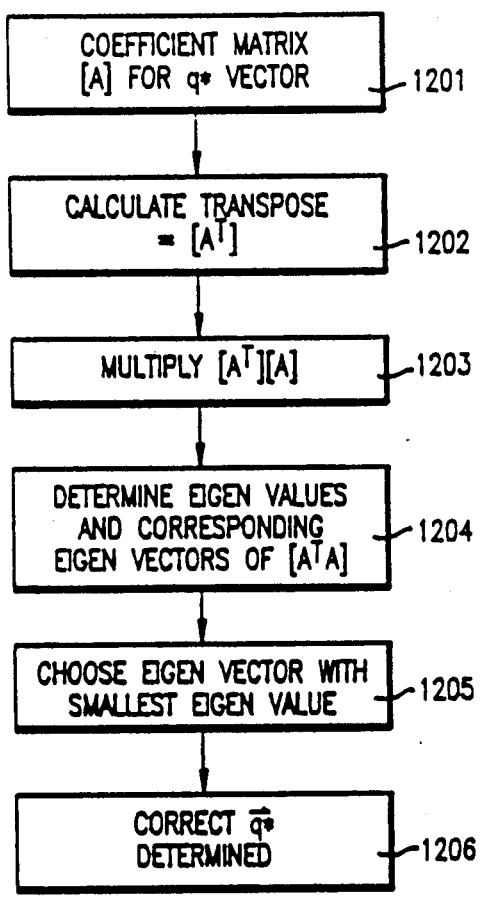

If more than 8 object points are identified in both images, so that the number of equations arising from N object points is greater than 8, then a least squares solution for 8 of the elements of the $\dot{q}^*$ vector relative to a ninth value is utilized. Referring to FIG. 12, the mathematical steps involved in the least-squares solution which is employed are as follows: the transpose of the [A] matrix is determined, 1202, and [A] is premultiplied by [A_T], 1203. The eigenvalues and normalized eigenvectors of the product matrix $[A^TA]$ are then determined, 1204, where an ith normalized eigenvector $\hat{E}_i$ and a corresponding ith eigenvalue $M_i$ are defined by:

$$[A^TA][\hat{E}_i] = M_i[\hat{E}_i] \quad \text{[Eqn. 29a]}$$

where $[A^TA]$ is the 9×9 product matrix, and $\hat{E}_i$ is a normalized 9×1 column eigenvector. The normalized eigenvector corresponding to the smallest eigenvalue of the $[A^TA]$ matrix is selected, 1205, and the elements of the $\dot{q}^*$ vector are set equal to the elements of this normalized eigenvector, 1206. In this way, the correct values of the elements of the $\dot{q}^*$ vector, relative to a ninth value or scaling factor to be calculated as described hereinafter, are determined.

Regardless of the method utilized to determine the $\dot{q}^*$ vector, since eight of the nine values will be expressed relative to a ninth value, the solution set of $\dot{q}^*$ elements contains only eight independent values. The immediate task is to determine the values of the elements of [R] and $\hat{t}$ from the eight independent values of elements of $\dot{q}^*$. After the elements of [R] and $\hat{t}$ have been found, the 3-D coordinates of each object point can be calculated from any three of Eqns. 21 through 24.

The task to determine [R] and $\hat{t}$ is begun, referring again to FIGS. 2 and 3, by formulating the [Q*] matrix from elements of the $\dot{q}^*$ vector, 309 and 205, such that:

$$[Q^*] = \begin{bmatrix} q^*_1 & q^*_2 & q^*_3 \\ q^*_4 & q^*_5 & q^*_6 \\ q^*_7 & q^*_8 & q^*_9 \end{bmatrix} \quad \text{[Eqn. 29b]}$$

Note that Eqn. 27 indicates that:

$$[\tilde{Q}][Q] = [\tilde{S}][\tilde{R}][R][S] \quad \text{[Eqn. 30]}$$
$$= [\tilde{S}][S]$$

where $[\tilde{Q}]$ represents the transpose of [Q], etc. Note that Eqn. 30 contains the [Q] and $[\tilde{Q}]$ matrices, which are the matrices containing the true, non-scaled q elements; whereas Eqn. 29b contains the [Q*] matrix, the elements of which differ from the elements of the true [Q] matrix by some yet to be determined, constant scale factor. The constant scale factor arises from the solution of the relative $\dot{q}^*$ vector, described hereinabove.

The second line of Eqn. 30 follows from the first because the transpose of any rigid rotation matrix is its inverse; thus, $[\tilde{R}][R] = [I]$, where [I] is the 3×3 identity matrix. From the definition of [S] in Eqn. 28, Eqn. 30 yields:

$$[\tilde{Q}][Q] = \begin{bmatrix} (t_y^2 + t_z^2) & (-t_xt_y) & (-t_xt_z) \\ (-t_xt_y) & (t_x^2 + t_z^2) & (-t_yt_z) \\ (-t_xt_z) & (-t_yt_z) & (t_x^2 + t_y^2) \end{bmatrix} \quad \text{[Eqn. 31]}$$

But, from Eqn. 25:

$$t_x^2 + t_y^2 + t_z^2 = 1. \quad \text{[Eqn. 32]}$$

Substitution of Eqn. 32 into Eqn. 31 yields:

$$[\tilde{Q}][Q] = \begin{bmatrix} (1 - t_x^2) & (-t_xt_y) & (-t_xt_z) \\ (-t_xt_y) & (1 - t_y^2) & (-t_yt_z) \\ (-t_xt_z) & (-t_yt_z) & (1 - t_z^2) \end{bmatrix} \quad \text{[Eqn. 33]}$$

The trace of the product matrix $[\tilde{Q}][Q]$, or, equivalently, $[Q^T][Q]$, where the trace of a matrix is defined as the sum of the matrix elements along the diagonal, is given by:

$$\text{Trace}([\tilde{Q}][Q]) = 3 - (t_x^2 + t_y^2 + t_z^2) = 2 \quad \text{[Eqn. 34]}$$

Similarly, the trace, 312, of the product matrix $[\tilde{Q}^*][Q^*]$, is given by:

$$\text{Trace}([\tilde{Q}^*][Q^*]) = 3c^2 - (t_x^2 + t_y^2 + t_z^2) \cdot c^2 = 2c^2$$

where c represents the constant scale factor of the [Q*] matrix resulting from the solution of the relative $\dot{q}^*$ vector, described hereinabove. Thus, the trace of $([Q^*][Q^*])$ will differ from the trace of $([Q][Q])$ by a factor of $c^2$. Therefore, in order to normalize the elements of the [Q*] matrix such that the magnitudes and relative signs of the elements in the normalized matrix are equal to the magnitudes of the elements of the [Q] matrix, the elements of a matrix [Q**] are computed so that:

$$[Q^{**}] = \frac{1}{\sqrt{\frac{1}{2}\text{Trace}([\tilde{Q}^*][Q^*])}} [Q^*]. \quad \text{[Eqn. 35]}$$

This normalization, 313 and 206, assures that [Q] satisfies both Eqn. 34 and the system of linear equations with the form of Eqn. 29. Thus, the matrix [Q] must equal ±[Q]; the ambiguity of sign occurs because with each element $q^{}_{kl}$ of [Q] defined by Eqn. 35, the matrix $(-1)[Q^{}]$ with elements $(-1)(q^{}_{kl})$ also satisfies both Eqn. 34 and the system of linear equations with the form of Eqn. 29. However, it is noted that this uncertainty concerning the sign of [Q] does not affect the sign of the quadratic product, $[\bar{Q}^{}][Q^{}]$, which is equal to the matrix product $[\bar{Q}][Q]$.

Having obtained the elements of $[\bar{Q}][Q] = [\bar{Q}^{}][Q^{}]$ in this way, the unit vector $\hat{t}$ (i.e., the quantities $t_x, t_y,$ and $t_z$) is determined, 315 and 207, from Eqn 33. However, as in the determination of [Q], the sign of the unit vector $\hat{t}$ will be ambiguous, because both $\hat{t}$ and $(-1)\hat{t}$ satisfy Eqn. 33. In the following, let $\hat{t}^{**}$ represent an arbitrary choice of the sign of the elements $(t_x, t_y, t_z)$ that satisfy Eqn. 33. Described hereinafter is a method for resolving the ambiguities of the signs of [Q] and $\hat{t}$.

The analysis next addresses the remaining task of using the knowledge of the magnitudes and relative signs of the elements of [Q] and $\hat{t}$, to determine the matrix [R].

As noted earlier, the kth row of [Q], which we shall denote by $\bar{q}_k$, represents the vector cross product $\hat{t} \times \hat{r}_k$, where $\hat{r}_k$ is the kth row of [R]. It has been shown (Nature 1981; 293:133–135) that the first row of [R] is given by $$\hat{r}_1 = (\bar{q}_1 \times \hat{t}) + (\bar{q}_2 \times \hat{t}) \times (\bar{q}_3 \times \hat{t}) \qquad [\text{Eqn. 36}]$$

the second row of [R] is given by $$\hat{r}_2 = (\bar{q}_2 \times \hat{t}) + (\bar{q}_3 \times \hat{t}) \times (\bar{q}_1 \times \hat{t}) \qquad [\text{Eqn. 37}]$$

and the third row of [R] is given by $$\hat{r}_3 = (\bar{q}_3 \times \hat{t}) + (\bar{q}_1 \times \hat{t}) \times (\bar{q}_2 \times \hat{t}) \qquad [\text{Eqn. 38}]$$

Recall that both [Q] and $\hat{t}$ are known at this point except for uncertainty with regard to sign of each: thus, from Eqns. 36 through 38, the matrix [R] can be calculated, 316–317, and 208, for each possible combination of $\pm[Q^{}]$ and $\pm\hat{t}^{}$. Careful consideration of Eqns. 36 through 38 shows that there are two possible solutions for [R] and that each is consistent with both $\hat{t}^{}$ and $(-1)\hat{t}^{}$. In this way, one can determine four possible combinations of [R] and $\hat{t}$, which correspond to the two possible signs on $\hat{t}^{**}$ and the two possible matrices coordinates $x_i, y_i,$ and $z_i$ for each object point with scaled image coordinates $(\xi_i, \eta_i)$ and $(\xi_i', \eta_i')$, as in 318–320 and 209. Specifically, if we substitute Eqns. 23 and 24 into Eqn. 22, we find that $$z_i = \left[\frac{(\hat{r}_1 - \xi_i'/\hat{r}_3) \cdot \hat{t}}{(\hat{r}_1 - \xi_i'/\hat{r}_3) \cdot \hat{u}}\right]$$

$$= \left[\frac{(r_{11} - \xi_i'/r_{31})x_s + (r_{12} - \xi_i'/r_{32})x_y + (r_{13} - \xi_i'/r_{33})x_z}{(r_{11} - \xi_i'/r_{31})x_i + (r_{12} - \xi_i'/r_{32})\eta_i + (r_{13} - \xi_i'/r_{33})}\right]$$

then Eqns. 32 and 24 give $$x_i = \xi_i z_i \qquad [\text{Eqn. 40}]$$

and $$y_i = \xi_i z_i \qquad [\text{Eqn. 41}]$$

We note also from Eqn. 16 that $$z_i' = r_{31}(x_i - t_x) + r_{32}(y_i - t_y) + r_{33}(z_i - t_z) \qquad [\text{Eqn. 42}]$$

It has been pointed out (Nature 1981: 293:133–135) that although there are four possible combinations of [R] and $\hat{t}^{**}$, only one of these combinations will make both $z_i > 0$ and $z_i' > 0$ for all of the object points. On physical grounds, all the values of $z_i$ and $z_i'$ must be greater than zero, because the object must lie between the x-ray focal spot and the image plane in both views of the biplane imaging system. Thus, uncertainty concerning the combination of [R] and $\hat{t}$ actually employed in image formation is resolved, 21 and 210, and the 3-D coordinates of the object points $(x_i, y_i, z_i; i = 1, \ldots, N \geq 8)$, are determined uniquely in units of the x-ray source translation distance $\bar{t}$, 211 and 323.

The unit translation vector $\hat{t}$ may subsequently be scaled to its correct, absolute value, in one of two ways.

As described previously herein, the absolute distance between two radiopaque markers that are used as object points may be employed, by computing the scaled distance between the calculated 3-D positions of the radiopaque markers, and by taking the ratio of this scaled distance to the known absolute distance between the markers. This ratio may then be used to scale the values of the $\hat{t}$ vector, 322, using the relationship:

$$\vec{T} = \frac{1}{\text{ratio}} \cdot \hat{t}$$

where $\vec{T}$ is the absolute translation vector. The absolute 3-D positions of the object points may then be re-calculated, utilizing the absolute translation vector.

Alternatively, the absolute distance between the x-ray focal spots could be directly measured, as described previously herein, and the magnitude of the unit $\hat{t}$ vector simply scaled to this absolute distance. The absolute 3-D positions of the object points can then be re-calculated.

The method for determining complete vascular structure, or, in other words, the structure of the intevening vasculature between the already selected object points, the 3-D positions of which have been determined hereinabove, is now described. This process involves, among other procedures, automated tracking of the vasculature, and is shown in Step 4 in FIG. 1.

Referring now to FIG. 4, following calculation of the 8 basic parameters and the 3-D locations of the vessel bifurcation points, the structure of the rest of the vasculature is determined as follows.

First, two corresponding bifurcation points, 21, are selected in both images by the computer. The two bifurcation points correspond to two of the object points selected in Step 3. The vessel segment between the bifurcation points is then tracked using a vessel tracking algorithm already developed, 22. (KR Hoffmann et al., SPIE Medical Imaging, Vol. 626, p. 326, 1986). Using points along the center of the vessel that are determined by the tracking algorithm, a polynominal curve, generally of 1st, 2nd or 3rd order, is fitted to the center points, 23. A point is then selected on the fitted polynominal centerline in the first image, 24, which is a specified distance (in pixels) from one of the selected bifurcation points. The coordinates of this selected point, $(u_i, v_i)$, are utilized with the $[R]$ matrix and $\vec{T}$ vector, determined in Step 3, to calculate a "correspondence line" in the second image, 25. The correspondence line is the line in image 2 which contains the set of all possible points in image 2 which could correspond to the selected point in image 1, and has the following standard form:

$$v_i' = \left[ \frac{(\vec{r}_2 \cdot \vec{\xi}_i)(\vec{r}_1 \cdot \vec{t}) - (\vec{r}_2 \cdot \vec{t})(\vec{r}_1 \cdot \vec{\xi}_i)}{(\vec{r}_3 \cdot \vec{\xi}_i)(\vec{r}_1 \cdot \vec{t}) - (\vec{r}_1 \cdot \vec{\xi}_i)(\vec{r}_3 \cdot \vec{t})} \right] u_i' + D' \left[ \frac{(\vec{r}_2 \cdot \vec{\xi}_i)(\vec{r}_1 \cdot \vec{t}) - (\vec{r}_1 \cdot \vec{\xi}_i)(\vec{r}_2 \cdot \vec{t})}{(\vec{r}_3 \cdot \vec{\xi}_i)(\vec{r}_1 \cdot \vec{t}) - (\vec{r}_1 \cdot \vec{\xi}_i)(\vec{r}_3 \cdot \vec{t})} \right],$$

where $\vec{r}_k$ represents the kth row of the rotation matrix $[R]$, and $\vec{r}_k \cdot \vec{t}$ represents the scalar vector product of the kth row of the $[R]$ matrix with the $\vec{t}$ vector, and where $\vec{r}_k \cdot \vec{\xi}_i$ represents the scalar vector product of the kth row of the $[R]$ matrix with the $\vec{\xi}_i$ vector of scaled image coordinates.

Corresponding points in images 1 and 2 correspond to the same point on the object. Determination of the intersection, 26, of the correspondence line with the fitted polynominal centerline in image 2, thus produces the coordinates of the point in the second image, $(u_i', v_i')$, which corresponds to the selected point in the first image, $(u_i, v_i)$. Another possible method to determine the coordinates of the corresponding point in the second image incorporates the method of Szirtes, cited earlier. This is basically an iterative method which determines the corresponding point in the second image by successive approximations.

The image coordinates $(u_i, v_i)$ and $(u_i', v_i')$ are then used to calculate the 3-D position of the point on the vessel segment, 27, that is imaged at the respective point in image 1 and the corresponding point in image 2. Following this, another point is selected on the centerline in the first image, and the procedures in 24-27 are repeated, until the end of the centerline is reached, 28. Following this, another vessel segment image is determined from two selected bifurcation points, and the procedures in 21-28 are repeated, until no more vessel segment images remain, 29. In this way, the 3-D positions of the vessel segments, and thereby, the 3-D structure of the vascular tree are determined.

In Step 5 of FIG. 1 is described the display of the resulting 3-D vascular data. Referring now to FIG. 8, structural data may be displayed on a CRT monitor, and may be done in any fashion preferred by the physician or technician.

An illustration of the implementation of the present invention in a biplane radiographic system is shown in FIG. 8. In this figure, an object (or patient) 100 is irradiated from x-ray tubes 102, 104 which in combination with respective I.I.-TV systems 106, 108 perform biplane imaging. Images produced by systems 106, 108 are digitized by A/D converters 110, 112, respectively and transferred to host computer 114, which performs the processing steps above described, and described in more detail hereinafter, to obtain a 3-D image displayed on display 116, or on CRT displays 118 and 120, as described herein. Biplane images, on the other hand, from systems 106, 108 are displayed on CRT displays 118, 120, respectively. X-ray generator control units 120, 122 respectively control the output of x-ray tubes 102, 104 using conventional control techniques, so that appropriate x-ray doses are transmitted through the object and received with sufficient intensity by the I.I.-TV systems 106, 108.

The implementation of this invention will be relatively easy and inexpensive. Although the mathematical derivations outlined hereinafter in this document are complex, the actual number of mathematical operations utilized in this method is small. Following the selection of 8 or more object points in both images, the calculation of the 8 basic parameters and the 3-D locations of the selected points requires no more than 1 second on a VAX 11/750 computer. If this process were implemented as hardware in the host computer of a digital imaging system, the calculation time would be reduced to a small fraction of 1 second. The time required for the subsequent determination of a complete vascular structure would be dependent upon the desired "fineness" or "coarseness" of the 3-D structural information, where "fineness" or "coarseness" is defined by the distance in pixels along the fitted polynomial centerline in the first image which separates the selected points on the fitted polynomial centerline. However, even very "fine" structures should not take more than a few minutes to compute on a VAX 11/750, and in hardware implementation would probably require 10 seconds or less.

No large data structures other than the images themselves are utilized in this invention, and therefore a computer for image processing as large as the VAX 11/750 is not required. A personal computer of respectable size would probably suffice. The only other equipment required for the implementation of this invention, aside from the biplane digital imaging system itself, is the described in Step 1 hereinabove already mentioned, if the biplane digital system is designed with this invention installed, even this apparatus would not be needed.

Finally, the application of this invention in real time to digital images acquired at high frame rate, as in cardiac angiography, is possible. Following the determination of the 8 parameters and the 3-D vessel structure from two images obtained at end-diastole, for example, the 3-D positions of the bifurcation points in the vascular tree could then be re-calculated in real time to fit the moving bifurcation points, thus producing the moving 3-D structure of the coronary vascular tree in real time. This particular application could be very useful in interventional procedures such as coronary angioplasty.

Computer Simulation Experiments

To demonstrate the feasibility of the method of the invention for determining 3-D structure, computer simulation experiments have been performed, as next described. By using a computer to generate "images" of simulated "object points" of known 3-D position, and then by applying the present method to these images, the accuracy of the recovered 3-D object information has been examined.

In general, the computer simulations involved several steps:

simulation step 1)—Input of basic information describing the biplane imaging setup and the geometrical relationship between the two views. Specifically, the input information is as follows:

(a) Image field size, set equal to 23 cm.

(b) Distances from the focal spots to the imaging planes in the two views, D and D'. In many of the simulations, these values were both set to 90 cm. However, some of the simulations incorporated different values for D and D', ranging from 80 to 100 cm. These distances are commonly used in actual biplane angiographic setups.

Figure 15A:
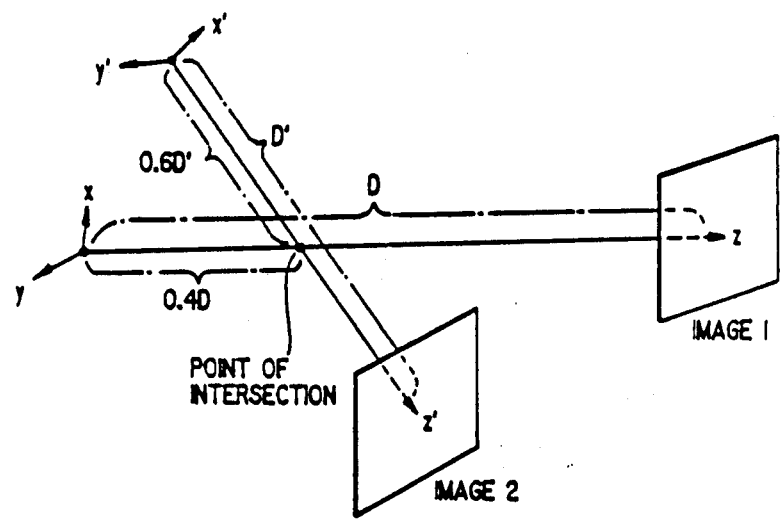

(c) Location of intersection of the z and z' axes of the coordinate systems for the two views, expressed as the ratio of the distance of the intersection from the focal spots to the values of D and D', $s_1$ and $s_2$. As shown in FIG. 15a, the crossing of the z and z' axes may occur at, for example, 0.4*D in the first view, and 0.6*D' in the second view. For many of the simulations, the values of $s_1$ and $s_2$ were set at 0.5*D and 0.5*D', but this was varied for some of the simulations.

Figure 15B:
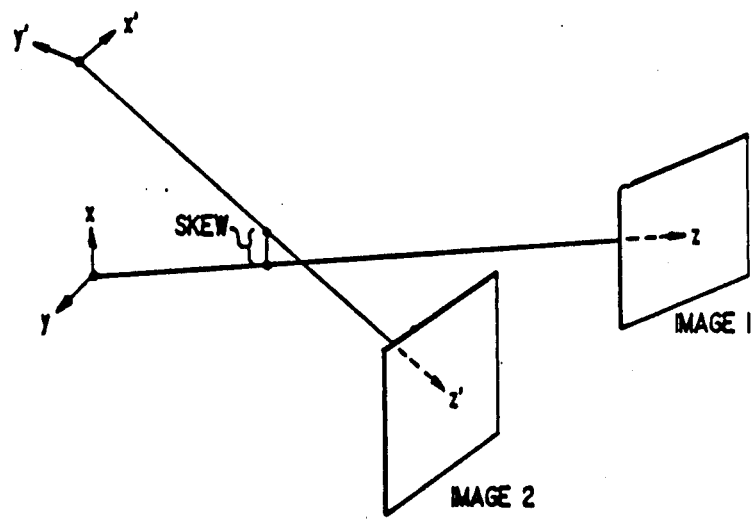

(d) Amount of "skew" between the z and z' axes. For the general biplane case, the z and z' axes may not cross exactly, but instead there may be some amount of skew. (See FIG. 15b.) This is not generally desirable in biplane imaging, because it reduces the "common volume" of the imaging system. (The common volume is that volume of the object or patient which is imaged in both views.) Thus, a "perfect" biplane system would involve no skew, but actual systems may often involve some skew. Therefore, effect of varying amounts of skew in the imaging system was examined.

(e) Amount of relative rotation, in degrees, between the two views, about three orthogonal directions. As illustrated in FIGS. 16a, 16b and 6c, it is possible to specify an arbitrary relative rotation of the x'y'z' coordinate system by successive rotations about the x', y' and z' axes. The effect of relative rotations of in each of the three orthogonal directions was examined.

simulation step 2)—With this input information, the simulated biplane imaging system is completely defined. The true rotation matrix $[R]_{true}$ (which describes the relative rotation between the two views) is determined from the information in (e) above. The true translation vector $\vec{t}_{true}$ (which describes the translation between the two x-ray sources) is determined using the input information in (b) through e).

simulation step 3) A selected number of randomly located object points are positioned within the common volume of the biplane system. The 3-D coordinates of the object points are determined with a random number generator. These true 3-D coordinates are compared later with the final calculated 3-D coordinates of the object points.

simulation step 4) Using only the image coordinates in both views of the set of randomly located object points, and the method according to the invention, a rotation matrix [R] and a translation vector $\vec{t}$, as well as the 3-D positions of the object points, are calculated and are compared with their true values determined in simulation steps 2 and 3.

Figure 18:
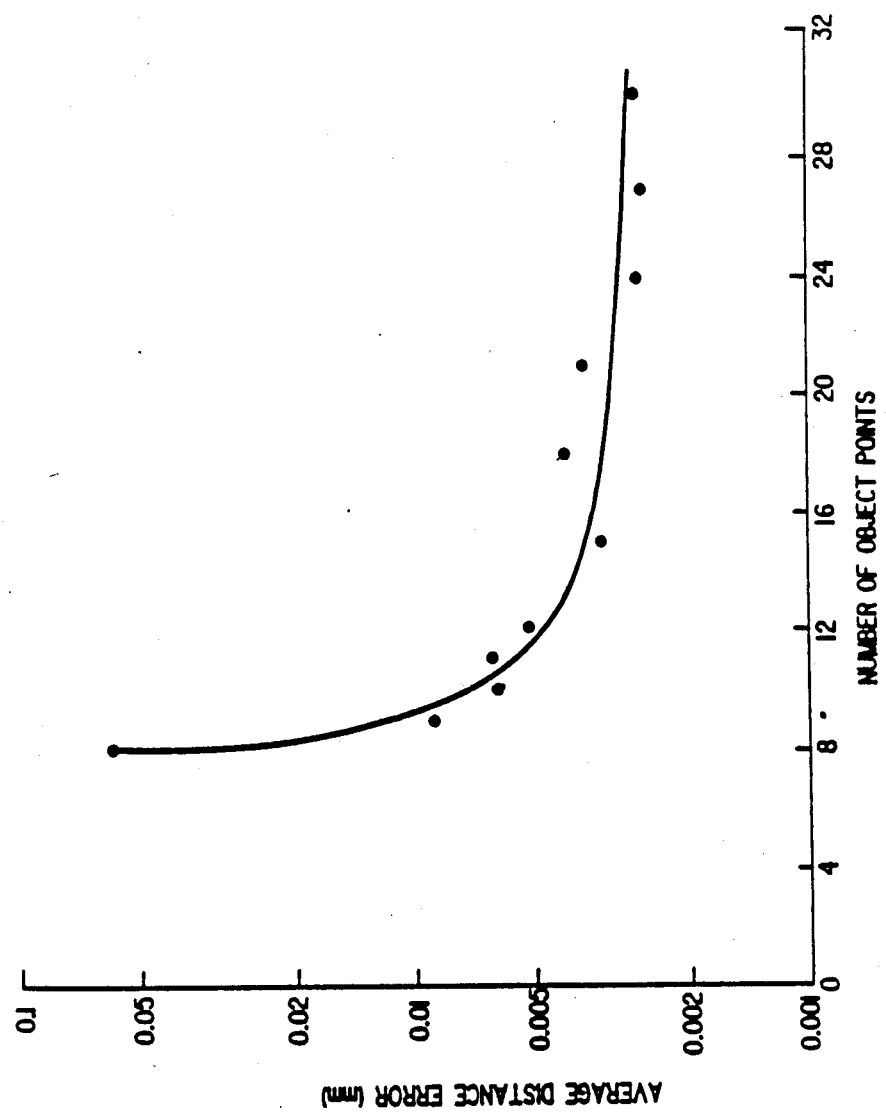
FIGS. 18 and 19 are graphs illustrating the effect of the number of object points and angle of rotation, respectively, on the average distance error in the computer simulation study, respectively.
Figure 19:
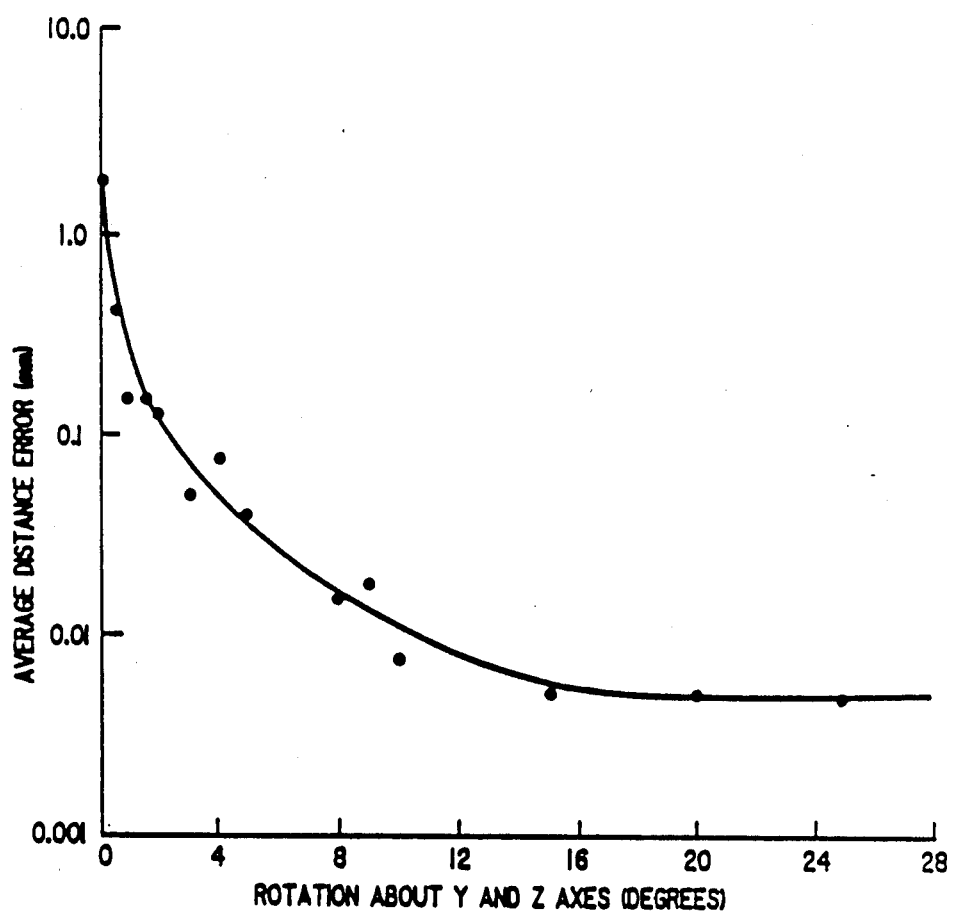

Pertinent results of the simulations are shown in FIGS. 17, 18 and 19. A convenient index to indicate the "goodness" of the results of a simulation is the average distance between the original 3-D positions of the object points produced by the random number generator, and the final calculated positions of the object points. This average distance may be calculated in either the xyz coordinate system or the x'y'z' coordinate system. The Table in FIG. 17 shows the results for simulations with fixed numbers (N=8, 9 and 15) of random object points, for many different imaging geometries. In each case, the average distance indicated in Table 1 is calculated from 100 different combinations of random object points in a single imaging geometry.

The important general conclusions to be drawn from the simulation results are as follows:

1. On average, determination of 3-D object point locations to within 0.1-0.001 mm is achievable.

2. Varying D,D', $s_1$ and $s_2$ had no substantial effect on the accuracy of the calculated positions of the object points.

3. Skews of up to 40 mm had no substantial effect on the accuracy of the calculated positions of the object points.

4. As is evident from FIG. 18, the accuracy of the approach appears to improve when the number of random points utilized is increased. The reason for this is not presently clear, but may be related to computer roundoff error occuring at several steps in the computational procedure. This topic remains to be investigated.

5. The accuracy of the method decreases (i.e. the average distance increases) when there are multiple zeroes appearing in the original rotation matrix and translation vector. For example, an imaging geometry defined by a simple relative rotation about the x axis of 90°, combined with a point of intersection of the z and z' axes at 0.5*D and 0.5*D', results in the following rotation matrix and translation vector:

$$[R] = \begin{bmatrix} 1.0 & 0 & 0 \\ 0 & 0 & 1.0 \\ 0 & -1.0 & 0 \end{bmatrix}$$

$$\vec{t} = [0, 45 \text{ cm}, 45 \text{ cm}]$$

Perhaps surprisingly, this relatively "simple" imaging geometry results in larger errors than more complex geometries. This appears to be due to the increased relative importance of computer roundoff error in the computation of matrix elements equal to exactly zero. However, it is important to note that in actual imaging situations, it is highly unlikely that any elements of the rotation matrix or translation vector would be equal to exactly zero, so this problem becomes significant only in simulation studies. For these reasons, many of the simulation studies were done with at least a small rotation in all three orthogonal directions. This ensures that most of the elements in the rotation matrix and the translation vector are nonzero, and avoids this relatively artificial computational problem.

6. As is evident from FIG. 19, simulation errors tend to be larger for biplane geometries where the angle between the two views is very small, for example in setups where the rotations were 10°, 0°, and 0°. This is not surprising, because the method must fail entirely when the angle between the views is zero degrees (i.e. when the two images are in fact obtained from exactly the same orientation, and are identical, making it impossible to derive any 3-D information). Thus, the errors in the method should increase when the angle between the two views becomes very small.

7. Except for the special cases outlines in results 5 and 6 above, the accuracy of the method does not depend on the relative geometry of the two imaging views of the biplane system.

Accordingly, these simulations have shown that this method for determining 3-D structure of object points without knowledge of the relative geometry of the two views is feasible and is highly accurate.

Obviously, numerous modifications and variations of the present invention are possible in light of the above teachings. It is therefore to be understood that within

What is claimed as new and desired to be secured by Letters Patent of the United States is:

1. A method for determination of 3-D structure of an object in biplane angiography, comprising:

providing first and second imaging systems including first and second x-ray sources each having a focal spot and respective first and second x-ray sensitive receivers each defining an image plane, said first x-ray source arranged to transmit x-rays from its focal spot in a first direction through said object to the image plane of said first receiver and said second x-ray source arranged to transmit x-rays from its focal spot in a second direction arbitrarily selected with respect to said first direction through said object to the image plane of said second receiver;

determining the distances (D, D') of perpendicular lines from the focal spot of each x-ray source to the image plane of the respective receiver;

determining the points on respective image planes where respective perpendicular lines from the respective focal spots to the respective image planes intersect the respective image planes and defining said points on respective image planes as the origins of respective two dimensional image coordinate systems (uv), (u'v') at the respective image planes, wherein said focal spots and the respective image planes define respective first and second three-dimensional coordinate systems having respective z axes coincident with said perpendicular lines (D, D') in the directions of respective image planes, x axes parallel to respective of the image plane axes (u, u') and y axes parallel to respective of the image plane axes (v, v'), where the relative geometry of said first three dimensional coordinate system with respect to said second three dimensional coordinate system is defined by $$\bar{x}_1' = [R](\bar{x}_1 - \bar{t}),$$

where $\bar{x}_1'$, is the position vector of the object point $(x_i', y_i', z_i')$ in said second three dimensional coordinate system, $\bar{x}_1$ is the position vector of the same object point $(x_i, y_i, z_i)$ in said first three dimensional coordinate system, [R] is a rotation matrix defining the rotation in three-dimensional space between the first and second three-dimensional coordinate systems and $\bar{t}$ expresses, in the first coordinate system xyz, a unit translation vector that moves the origin of the first coordinate system xyz to the origin of the second coordinate system;

irradiating said object with x-rays from said x-ray sources and producing respective first and second images defined by digital image data based on the x-rays received by said first and second receivers;

determining from each of said first and second images the image coordinates ((u, v), (u', v')) in the respective coordinate systems of N objects points, where $N \geq 8$, which correspond to the same object points in the object;

scaling the image coordinates $(u_i, v_i)$, $(u_i', v_i')$ of said eight points by respectively dividing said image coordinates by the respective distances (D, D') to obtain normalized image coordinates $(\xi_i, \eta_i)$, $(\xi_i', \eta_i')$;

constructing N linear equations, one for each object point, containing only normalized image coordinates $(\xi_i, \eta_i)$, $(\xi_i', \eta_i')$ and nine unknown elements $(q_{kl})$, where $q_{kl}$ represent an unknown relative geometry between the two imaging systems in terms of nonlinear combinations of the elements of the translation vector (t) and the rotation matrix [R];

solving the N linear equations for eight of the $q_{kl}$ values relative to the ninth $q_{kl}$ value to produce a matrix [Q*]; and determining scaled three dimensional coordinate $(x_i, y_i, z_i)$ of said N object points expressed in units of a unit translation vector $\bar{t}$ from the product matrix $[Q^*]^T[A^*]$.

2. The method according to claim 1, further comprising:

defining at least two of said N object points as object points separated by a know distance;

determining the scaled distance between said at least two object points from the scaled three dimensional coordinates $x_1, y_1, z_1; x_2, y_2, z_2$) of said at least two object points;

determining the ratio of the scaled distance between said at least two object points and the known separation distance therebetween to derive a scaling factor;

producing an absolute $\bar{t}$ vector based on the quotient of the unit $\bar{t}$ vector and said scaling factor; and determining absolute three-dimensional coordinates of object points using said absolute $\bar{t}$ vector, said rotation matrix [R] and said image coordinates $((u_i, v_i), (u_i', v_i'))$ in said image planes.

3. The method according to claim 2, further comprising:

selecting plural of said N object points as bifurcation points between tracked vessels of a vascular tree of said object;

defining approximate centerlines of vessel segments between said bifurcation points in each of said biplane images;

determining corresponding points in the two biplane images along said centerlines; and determining from said corresponding points, [R] and $\bar{t}$ three dimensional positions of the points along the vessel segments between said bifurcation points.

4. The method according to claim 3, comprising:

displaying said three dimensional positions of the points along the vessel between said bifurcation points.

5. The method according to claim 1, comprising:

determining the absolute distance between the focal spots of said x-ray sources; and multiplying the scaled three dimensional coordinates $(x_i, y_i, z_i)$ of said object points by the determined absolute distance between the focal spots to obtain absolute three-dimensional coordinates of said object points.

6. The method according to claim 5, further comprising:

selecting plural of said N object points as bifurcation points between track vessels of a vascular tree of said object;

defining approximate centerlines of vessel segments between said bifurcation points in each of said biplane images;

determining corresponding points in the two biplane images along said centerlines; and determining from said corresponding points, [R] and $\bar{t}$ three dimensional positions of the points along the vessel segments between said bifurcation points.

7. The method according to claim 5, comprising:
displaying said three dimensional positions of the points along the vessel between said bifurcation points.

8. The method according to claim 1, further comprising:
selecting plural of said N object points as identifiable corresponding points of vascular structure in said first and second images;
tracking the approximate centerlines of the various vascular segments in both images between said identifiable corresponding points to define a complete vascular tree in both images;
determining polynominal fitting functions which represent the centerlines of said various vascular segments in both images;
selecting various points along the polynominal centerlines in one of said images;
for each of the selected various points, determining an auxiliary line which is a locus of points in the second of said images that represents the set of all possible points in the second image that correspond to the selected point in the first image;
determining mathematically the intersection of the corresponding polynominal centerlines in the second image with the auxiliary lines in the second image, in order to the determine the points in the said second image which corresponds with said selected various points in said first image;
determining from said corresponding points, [R] and $\bar{t}$ the absolute three dimensional positions of the said selected points along the vessel segments between said identifiable corresponding points.

9. The method according to claim 8, further comprising:
displaying the absolute three dimensional coordinates of all the selected points of said object;
displaying of absolute three dimensional information as a complete, connected vascular tree, composed of originally identified identifiable corresponding points, as well as selected points along vascular segment centerlines.

10. The method according to claim 8, further comprising:
displaying the absolute three dimensional coordinates of all the selected points of said object;
displaying of absolute three dimensional information as a complete, connected vascular tree, composed of originally identified identifiable corresponding points, as well as selected points along vascular segment centerlines.

11. A method for determination of 3-D structure of an object in biplane angiography, comprising:
providing first and second imaging systems including first and second x-ray sources having respective first and second focal spots and respective first and second x-ray sensitive receivers each defining an image plane, said first x-ray source arranged to transmit x-ray from its focal spot in a first direction through said object to the image plane of said first receiver and said second x-ray source arranged to transmit x-rays from its focal spot in a second direction arbitrarily selected with respect to said first direction through said object to the image plane of said second receiver;
defining respective first and second three-dimensional coordinate systems, xyz and x'y'z', having respective origins located at respective of said first and second focal spots, and having respective z axes that are oriented toward the respective image planes and parallel to the respective line segments that are perpendicular to the respective image planes and intersecting the respective focal spots, where the relative geometry of said first three dimensional coordinate system with respect to said second three dimensional coordinate system is defined by $$\bar{x}_i' = [R](\bar{x}_i - \bar{t})$$

where, $\bar{x}_i'$ is the position vector of a point $(x_i', y_i', z_i')$ in said second three dimensional coordinate system, $\bar{x}_i$ is the position vector of the same point $(x_i, y_i, z_i)$ in said first three dimensional coordinate system, [R] is a rotation matrix defining the rotation in three-dimensional space between the first and second three-dimensional coordinate systems and $\bar{t}$ expresses, in the first coordinate system xyz, a unit translation vector that moves the origin of the first coordinate system xyz to the origin of the second coordinate system;
defining respective first and second image plane coordinate systems uvw and u'v'w', with origins located on the respective first and second image planes along the respective z and z' axes, and at distance D, and D', respectively, from the origins of xyz and x'y'z coordinate systems;
determining the distance D that separates the origin of the uvw coordinate system from the origin of the xyz coordinate system, and the distance D, that separates the origin of the u'v'w' coordinate system from the origin of the x'y'z' coordinate system, as being the respective perpendicular distances between said respective x-ray focal spots and image planes;
determining the positions on respective image planes where respective perpendicular lines from the respective focal spots to the respective image planes intersect the respective image planes and defining said points of intersection on respective image planes as the origins of the respective uvw and u'v'w' coordinate systems at the respective image planes;
irradiating said object with x-rays from said x-ray sources and producing respective first and second images defined by digital image data based on the x-rays received by said first and second receivers;
determining from each of said first and second images the image coordinates of N object points $((u_i, v_i), (u_i', v_i'))$ in terms of the respective image coordinate systems, where $N > 8$, which correspond to the same object points in the object;
scaling the said first and second image coordinates $((u_i, v_i), (u_i', v_i'))$ of said N points by respective dividing said image coordinates by the respective distances (D, D') to obtain normalized image coordinates $((\xi_i, \eta_i), (\xi_i', \eta_i'))$;
constructing N linear equations, one of each object point, containing only normalized image coordinates $(\xi_i, \eta_i), (\xi_i', \xi_i')$ and nine unknown elements $(q_{kl})$, and solving for the rotation matrix [R] and the unit translation vector $\bar{t}$; and
determining the three-dimensional coordinates of said N object points $(x_1, y_1, z_1; x_2, y_2, z_2)$, scaled to the length of the translation vector from the normalized image coordinates $((\xi_i, \eta_i), (\xi_i', \eta_i'))$ the rotation matrix [R] and unit translation vector $\bar{t}$.

12. The method according to claim 11, further comprising:

defining at least two of said N object points as object points separated by a know distance;

determining the scaled distance between said at least two object points from the scaled three dimensional coordinates $(x_1, y_1, z_1; x_2, y_2; , z_2)$ of said at least two object points;

determining the ration of the scaled distance between said at least two object points and the known separation distance therebetween to derive a scaling factor;

producing an absolute $\bar{t}$ vector based on the quotient of the $\bar{t}$ vector and said scaling factor; and determining absolute three-dimensional coordinates of object points using said absolute $\bar{t}$ vector, said rotation matrix [R] and said image coordinates $((u_i, v_i), (u_i'm\ v_i'))$ in said image planes.

13. The method according to claim 11, further comprising:

selecting plural of said N object points as identifiable corresponding points of vascular structure in said first and second images;

tracking the approximate centerlines of the various vascular segments in both images between said identifiable corresponding points to define a complete vascular tree in both images;

determining polynominal fitting functions which represent the said centerlines of said various vascular segments in both images;

selecting various points along the said polynominal centerlines in one of said images;

for each of the selected various points, determining an auxiliary line which is a locus of points in the second of said images that represents the set of all possible points in the second image that correspond to the selected point in the first image;

determining mathematically the intersection of the corresponding polynominal centerlines in the second image with the said auxiliary lines in the second image, in order to the determine the points in the said second image which corresponds with said selected various points in said first image;

determining from said corresponding points, [R] and $\bar{t}$ the absolute three dimensional positions of the said selected points along the vessel segments between said identifiable corresponding points.

* * * * *

UNITED STATES PATENT AND TRADEMARK OFFICE
CERTIFICATE OF CORRECTION

PATENT NO. : 4,875,165
DATED : October 17, 1989
INVENTOR(S) : LAURA E. FENCIL, ET AL It is certified that error appears in the above-indentified patent and that said Letters Patent is hereby corrected as shown below:

Column 1, line 5, before "BACKGROUND OF THE INVENTION" insert the following paragraph:

The present invention was made in part with U.S. Government support under grant numbers 2 R01 CA24806-11 and 5 R01 CA47043-03 from the Department of Health and Human Services and National Cancer Institute. The U.S. Government has certain rights in the invention.

Signed and Sealed this

Fourth Day of April, 1995

*Attest:*

BRUCE LEHMAN

*Attesting Officer*     *Commissioner of Patents and Trademarks*